United States Patent
Thirumalaisamy et al.

(10) Patent No.: US 12,190,705 B2
(45) Date of Patent: Jan. 7, 2025

(54) ELECTRONIC DEVICE WITH AUDIO SYSTEM TESTING

(71) Applicant: Apple Inc., Cupertino, CA (US)

(72) Inventors: Mruthun Rajkumar Thirumalaisamy, Cupertino, CA (US); Justin D. Crosby, Cupertino, CA (US); Mingzhou Li, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/944,858

(22) Filed: Sep. 14, 2022

(65) Prior Publication Data
US 2024/0087442 A1    Mar. 14, 2024

(51) Int. Cl.
G08B 21/24    (2006.01)
G01S 5/02    (2010.01)

(52) U.S. Cl.
CPC ............ G08B 21/24 (2013.01); G01S 5/0284 (2013.01)

(58) Field of Classification Search
CPC ...... G08B 21/24; H04R 29/00; H04R 29/001; H04R 29/002; H04R 29/003; G01S 5/0284; G01S 2205/01
USPC ........................................... 340/384.1–404.3
See application file for complete search history.

(56) References Cited

U.S. PATENT DOCUMENTS

| | | | |
|---|---|---|---|
| 6,171,138 B1 | 1/2001 | Lefebvre et al. | |
| 8,305,741 B2 | 11/2012 | Chatterjee | |
| 8,587,939 B2 | 11/2013 | McClure et al. | |
| 11,134,141 B1 | 9/2021 | Bushnell | |
| 2004/0131194 A1* | 7/2004 | Gruhle | H04R 29/001 381/59 |
| 2013/0223631 A1 | 8/2013 | Greuet et al. | |
| 2014/0119551 A1* | 5/2014 | Bharitkar | H04R 29/002 381/59 |
| 2018/0241489 A1* | 8/2018 | Daoura | H04L 67/10 |
| 2020/0337162 A1* | 10/2020 | Perkins | G04G 17/04 |
| 2021/0058725 A1 | 2/2021 | Millyard et al. | |

FOREIGN PATENT DOCUMENTS

CN    105183072    12/2015

* cited by examiner

*Primary Examiner* — Brian Wilson
(74) *Attorney, Agent, or Firm* — Brownstein Hyatt Farber Schreck, LLP

(57) ABSTRACT

An electronic device may include an enclosure, an antenna within the enclosure and configured to transmit a wireless signal to a remote electronic device to allow a location of the electronic device to be determined, an audio output system configured to produce an audible output, and a processing system within the enclosure and configured to determine, based on an electrical response induced in the antenna, whether the audio output system fails an audio output performance criteria when provided with an audio signal.

20 Claims, 12 Drawing Sheets

ELECTRONIC DEVICE WITH AUDIO SYSTEM TESTING

FIELD

The described embodiments relate generally to an electronic device, such as a wirelessly locatable tag, with audio system testing functionality.

BACKGROUND

Electronic devices like mobile phones and portable computers are used extensively around the world. Traditionally, a geographic location of an electronic device may be determined using a global positioning system (GPS) or other locating system or technique. However, it may be difficult to locate personal property that is not an electronic device or to locate electronic devices that lack a GPS. The systems and techniques described herein are generally directed to a wirelessly locatable tag that may be used to determine the location of electronic devices or other personal property or objects.

SUMMARY

An electronic device may include an enclosure, an antenna within the enclosure and configured to transmit a wireless signal to a remote electronic device to allow a location of the electronic device to be determined, an audio output system configured to produce an audible output, and a processing system within the enclosure and configured to determine, based on an electrical response induced in the antenna, whether the audio output system fails an audio output performance criteria when provided with an audio signal.

The enclosure may include a housing member and the audio output system may include a conductive coil coupled to an interior surface of the housing member. The conductive coil may be configured to interact with a magnetic field to impart a force on a first housing member, thereby moving a portion of the first housing member to produce the audible output. The audio output system may fail the audio output performance criteria when the audio output system does not produce an expected audio output in response to the audio signal.

The audio output system may include a conductive coil configured to interact with a magnetic field to impart a force on a diaphragm to produce the audible output, and the electrical response induced in the antenna is induced by the conductive coil when the audio signal is provided to the audio output system.

The audio output system may fail the audio output performance criteria when the electrical response induced in the antenna by the conductive coil is indicative of the conductive coil remaining stationary when the audio signal is provided to the audio output system. The conductive coil may be a first conductive coil, and the antenna may include a second conductive coil. The antenna may be a first antenna, and the electronic device may further include a second antenna.

The audio output system may satisfy the audio output performance criteria when the electrical response induced in the antenna by the conductive coil is indicative of the conductive coil moving when the audio signal is provided to the audio output system.

An electronic device may include a housing member defining an exterior surface of the electronic device, a voice coil coupled to the housing member and configured to receive an audio signal configured to cause the voice coil to move a portion of the housing member to produce an audible output, a conductive coil proximate the voice coil, and a processing system. The processing system may be configured to cause the audio signal to be supplied to the voice coil, detect an electrical response induced in the conductive coil while the audio signal is supplied to the voice coil, and determine whether the electrical response satisfies a condition indicative of the voice coil failing to move according to an expected motion for the audible output. The conductive coil may be an antenna. The antenna may be a near-field wireless communication antenna.

Determining whether the electrical response satisfies a condition indicative of the voice coil failing to move according to the expected motion for the audible output may include comparing an electrical signal induced in the conductive coil to an expected electrical signal. Comparing the electrical signal induced in the conductive coil to the expected electrical signal may include performing a cross-correlation operation.

The electronic device may further include an accelerometer configured to detect motion of the electronic device, and the audible output may be produced in accordance with a determination that the electronic device has moved and has not communicated with a particular remote electronic device for a predetermined duration.

The condition indicative of the voice coil failing to move according to the expected motion may be a lack of a voltage variation in the conductive coil when the audio signal is supplied to the voice coil.

An electronic device may include an enclosure, an audio output system configured to produce an audible output, an antenna within the enclosure, and a processing system configured to operate the antenna in a first mode of operation to transmit a wireless signal to a remote electronic device, operate the antenna in a second mode of operation to detect an electrical signal in the antenna while an audio signal is supplied to the audio output system, and determine whether the electrical signal is indicative of the audible output not being produced while the audio signal is supplied to the audio output system.

The antenna may be a near-field wireless communication antenna. The wireless signal may include an identifier of the electronic device. The antenna may be a first antenna, and the electronic device may further include a second antenna configured to send a wireless beacon signal to the remote electronic device to facilitate localization of the electronic device.

The audible output may be produced to alert a user to a location of the electronic device. The electronic device may further include an accelerometer configured to detect motion of the electronic device, and the audible output may be produced in accordance with a determination that the remote electronic device has moved and has not communicated with a particular remote electronic device for a predetermined duration.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
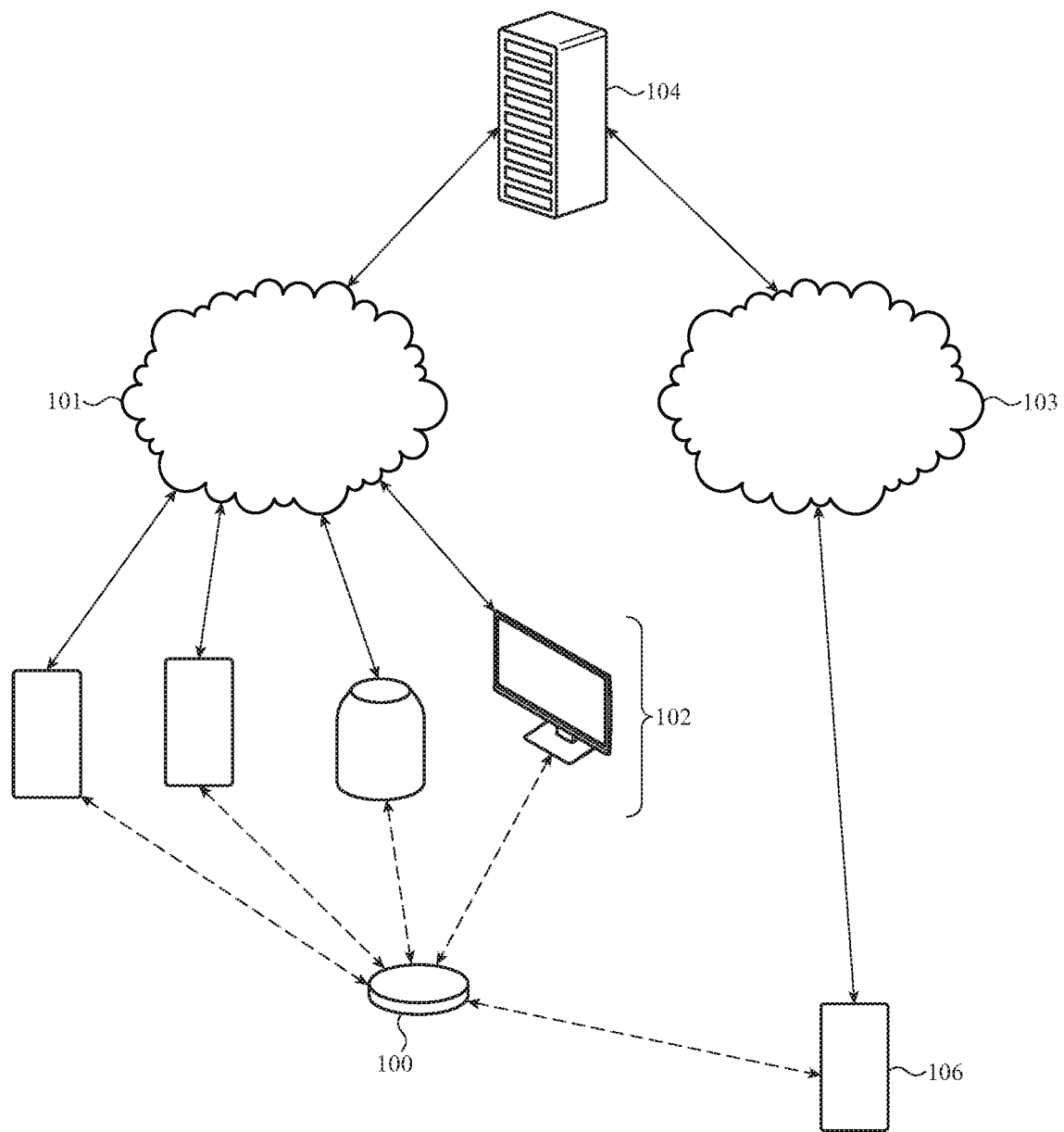
FIG. 1A depicts an example system for locating a wirelessly locatable tag.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a device, such as a small, battery-powered tag, puck, or other object of convenient size and shape, that can be physically and/or geographically located using wireless communications systems and techniques. For example, a tag may include an antenna that emits a wireless signal or beacon that is detectable by another electronic device such as a smartphone. Using the detected wireless signal (and using localization techniques such as time of flight, received signal strength indication, triangulation, etc.), the smartphone may be able to determine the position of the tag relative to the smartphone, and, using an absolute location of the smartphone from a GPS, the absolute location of the tag as well. In some cases, the tag itself may provide information about its location (e.g., from an onboard GPS or other localization or positioning systems) to the smartphone or other device. The embodiments herein also relate to the overall network environment that includes (or is defined by) the tags, smartphones, computers, and other devices, and that facilitates the locating of tags as well as numerous other features and functions. Knowing the location of a tag enables a wide range of location-based use cases. For example, the tag may be used to track the location of a portable object such as a set of physical keys, a purse, backpack, article of clothing, or other suitable object or item of personal property. Thus, if the portable object becomes lost or misplaced, a user may be able to find the object using his or her smartphone, tablet, or other suitable device.

A tag as described herein may include an audio output system to help a user locate a lost or missing tag (and the item to which the tag is attached). For example, if a user has lost a set of keys to which a tag is attached, the user may initiate an audio output mode in which the tag will emit a sound (e.g., one or more beeps or tones) to allow the user to physically find the object by finding the source of the sound. The audio output system may also be used to provide other information, such as a battery level indication (e.g., when a battery of the tag needs to be replaced), to indicate a status of the tag, or the like. In some cases, a tag may emit sound when it has been reported as "lost," which may help the user or other individuals locate the lost tag and return it (and any associated property) to its owner.

In some cases, the audio output system of a tag may become damaged or broken, such that audible outputs are not produced as expected, thereby impacting the overall performance and effectiveness of the tag. Accordingly, a tag may be configured to determine if its audio output system is working properly (e.g., if it produces an expected audible output in response to a particular audio signal).

In some cases, the tag may determine the operational status of an audio output system using an antenna that is also used for communication purposes. For example, a tag as described herein may include an antenna (e.g., an antenna for near-field wireless communications) that is positioned proximate an audio output system. The audio output system may include a conductive coil (e.g., a voice coil) that is positioned in a magnetic field and that is supplied with an audio signal to produce the audible output. The antenna, along with associated circuitry, may detect an electrical response induced by the coil while the audio signal is provided to the conductive coil. For example, when the coil is supplied with an audio signal, the coil moves in order to produce the audible output, and the resulting motion of the coil within the magnetic field may produce a characteristic electrical response that is detected using the antenna. If the audio output system is broken or damaged (such as may occur if the magnetic field is not present due to a magnet becoming demagnetized or displaced), the coil may not move in the expected manner, and thus the electrical response induced by the coil under these circumstances may be different from the electrical response induced by the coil when the audio output system is in working order. The tag may detect when the electrical response induced by the coil is not as expected for a given audio signal and perform an appropriate action in response.

FIG. 1A depicts an example system that may be used to physically and/or geographically locate a tag 100. The system may be facilitated in part by a cloud-based service or other host service with which multiple devices communicate to report and receive location information about other devices in the system. The operational links between devices (e.g., wirelessly locatable tags, phones, laptops, tablets, wireless headphones, etc.) and the cloud-based service may allow the system to provide robust localization of devices within the system. For example, devices in the system may be registered with the cloud-based service to allow the devices to communicate with the cloud-based service to both report and receive location data of tags and other devices in the system. Due to the communication and cooperation between and among the various devices in FIG. 1A to determine the location of tags and devices, the system shown in FIG. 1A may define and/or be referred to herein as a device-location relay network.

As used herein, localization refers to determining one or more spatial parameters of a tag or other wirelessly locatable device. Spatial parameters include parameters of an object that define an aspect of its distance, position, location, and/or orientation in absolute space or relative to another object. For example, spatial parameters may include parameters such as a distance between objects, a location in a particular geography (e.g., latitude and longitude coordinates), a unit vector pointing from one object to another object, an orientation (also referred to as an angular position or attitude) of an object in three-dimensional space, or the like.

Because the device-location relay network facilitates determining the locations of a user's devices, maintaining security and privacy of the user's location and other information is of the utmost importance. Accordingly, encryption and anonymization schemes may be used to secure data and prevent access to location data by devices or individuals that are not authorized to do so. In this way, location information may be securely handled by the device-location relay network without exposing location data or other potentially sensitive or private data associated with the various devices in the network. For example, devices, such as smartphones, may execute software that facilitates the sending and receiving of encrypted location reports to and from the cloud-based service, and allows users to see the locations of other devices in the network (only if they are authorized to do so). The cloud-based service may also facilitate the passing of encryption keys (e.g., public keys) between various devices to allow users of those devices to securely share their (or their devices') location without the risk of unauthorized users (including the cloud-service itself) having access to location information of a user's device.

Returning to FIG. 1A, the tag 100 may be configured to wirelessly communicate with devices 102 (e.g., mobile phones, laptop computers, desktop computers, wireless access points, digital assistants) when the tag is physically proximate to those devices (e.g., within a range of a wireless communication protocol such as ultra-wideband or Bluetooth). The devices 102 may determine the location (and/or other spatial parameter) of the tag 100 and display and/or report the location (and/or other spatial parameter) of the tag to a remote service. The location reports sent from the devices that detect the presence of a tag may be encrypted using a public-private key encryption scheme to ensure that only the owner of a tag can ultimately see the location of the tag.

One or more of the devices 102 and/or a device 106 (e.g., a smartphone or other device associated with an owner of a tag) may be associated with the owner of the tag. For example, one or more of the devices 102 and/or 106 may be the tag owner's phone, digital assistant, laptop or desktop computer, tablet computer, or the like. In such cases, the devices 102 and/or 106 associated with the same user or owner as the tag 100 may directly display the location of the tag 100 to a user. In other cases, such as where the tag 100 (or an object to which the tag is attached) is lost or misplaced outside of the user's home, the devices 102 and/or 106 may be or include other devices that are not owned or controlled by the user. For example, such devices may include any device that receives signals from the tag or establishes some form of wireless communication with the tag, and can also communicate with a server 104 (or any device associated with a network-accessible service) to report an encrypted, anonymized report that includes the location of the tag. Such devices may include phones, tablet computers, watches, or laptop computers of individuals who have no relationship to the tag's owner. As used herein, an "owner" of a tag refers to an individual or entity that controls, manages, supervises, operates, leases, owns, or otherwise exercises authority over a tag, and is not necessarily limited to an individual with legal ownership of the tag.

The tag itself may not be able to communicate directly to the server 104 to report its location, and indeed, it may not even be aware of its location, as it may lack a GPS or other system for independently determining its own absolute location. Devices that communicate with the tag 100, however, may be able to communicate to the server 104 to report the location of the tag 100. For example, devices such as phones, computers, and tablets may communicate with or otherwise detect the presence of a tag, and those devices may report, on an anonymous basis, the tag's location (and optionally an identifier of the tag and any other information, such as the time) to the server 104 (e.g., via a network 101 and/or a network 103). In addition to devices 102 and/or 106 reporting the locations of tags, the devices 102 and/or 106 themselves may act as tags and report their own locations to the server 104, and may report the locations of other devices 102 and/or 106 to the server 104 as well.

While FIG. 1A shows a few devices 102, and 106 and a single tag 100, this figure may represent only a small segment of a significantly larger network of tags and devices. Indeed, due to the ubiquity of mobile phones, tablet computers, and the like, the overall device-location relay network may be a dense, ad hoc or mesh-style network that can be used to track the location of many tags and devices. For example, in an urban environment, there may be hundreds of thousands or even millions of devices that can securely and anonymously report the positions and/or locations of tags. In this way, the devices and tags form a robust, multi-redundant device-location relay network that can continuously (and privately) monitor and update the locations of very many devices.

In some cases, the devices use their own locations as estimated locations of the tag. For example, if the device is able to connect to the tag via Bluetooth, it may be assumed that the tag is within about 30 feet of the device (or another distance, depending on the parameters of the Bluetooth communication). Thus, for example, the device may report the tag's location as an area centered about the user's device and having a radius that corresponds to the estimated range of the wireless communication protocol used to communicate to the tag. In other cases, the device may determine or estimate the location of the tag with greater accuracy. For example, the device may use time of flight (TOF), angle of arrival (AOA), time difference of arrival (TDOA) received signal strength indication (RSSI), triangulation, synthetic aperture, and/or any other suitable technique, to determine a location of the tag relative to the user's device. These localization techniques may use ultra-wideband signals from the tag, which may allow the device to locate the tag with a high degree of accuracy (e.g., to within one foot of the tag's actual location). Techniques for determining the spatial parameters of a tag, such as a distance between a tag and another device, a position of the tag relative to another device, a location of the tag, and an orientation of the tag, are described in greater detail with respect to FIGS. 1B-1D.

The tag 100 may communicate with nearby devices by sending a periodic wireless beacon signal. The wireless beacon signal, which may be transmitted using a Bluetooth communication protocol, ultra-wideband communication protocol, or any other suitable protocol, may be detectable by any device that is monitoring that protocol (e.g., receiving communications via that protocol). The wireless beacon signal, also referred to herein simply as a "beacon signal" or "beacon," may be transmitted at any suitable frequency, and the particular frequency may depend at least in part on a mode of the tag. For example, when the tag is in an initialization mode or pairing mode, the beacon may be transmitted at a first frequency; when the tag is in a lost mode (e.g., it has been reported to the device-location relay network as being lost, and that status has been provided to the tag), the beacon may be transmitted at a second frequency; and when the tag is in a normal or non-lost mode, the beacon may be transmitted at a third frequency.

The wireless beacon signal may be configured to cause a device to send a location report to the remote server. For example, a tag may transmit a wireless beacon signal to an external device, such as a mobile phone, tablet or laptop computer, or the like.

The beacon may include a public encryption key of the tag and optionally other information such as a tag identifier, a last reported location, a time since a last direct connection to another device, or the like. In some cases, the beacon and the optional additional information are sent to other devices using separate communications channels, protocols, or the like. For example, a tag may send a beacon signal using an ultra-wideband radio and send other information, such as the public key, via Bluetooth. Of course, other assignments of information types to different communications channels or protocols are also possible.

As described above, the tag may also include various systems that allow it to be more easily located once the owner is nearby (e.g., within a wireless communication range that allows the tag and another device to communicate, such as 300 feet, 100 feet, 30 feet). For example, the tag may include a speaker or other audible-output system. The owner of the tag may wirelessly command the tag (e.g., via Bluetooth and/or ultra-wideband protocols) to produce an audible output, which the owner can then use to find the tag. As another example, the tag may include an ultra-wideband (UWB) radio, and an owner's device may also include one or more UWB radios. The owner's device may be able to use a UWB localization signal emitted by the tag to estimate a position and/or location of the tag and/or guide the owner to the tag. For example, a user interface on the owner's device may display an arrow or other indicator that points the user towards the location of the tag. The arrow or other indicator may be a live view that continuously updates based on the position of the tag relative to the device, as well as the orientation of the device relative to the tag.

As described herein, localization of a wirelessly locatable tag may include the tag sending a signal to another device (e.g., a smartphone), allowing the other device to determine spatial parameters of the tag. Spatial parameters may include distances, orientations, positions, and/or locations.

As used herein, "distance" may refer to a measurement of how far apart two points (e.g., electronic devices, other objects, reference points, etc.) are from one another, and may refer to the length of the shortest possible path through space between the two points.

As used herein, the term "orientation" may refer to an attitude or angular position of an electronic device (e.g., a tag) relative to another electronic device (e.g., another tag or a smartphone), other point of interest, or reference frame. Orientation may be designated in terms of a rotation about one or more axes required to rotate from a current placement to a reference placement. Example measures of orientation may include Euler angles, Tait-Bryan angles (e.g., yaw, pitch, and roll), orientation vectors, orientation matrices, and the like.

As used herein, "position" or "relative position" of an electronic device may refer to the positional relationship of the electronic device in relation to another device, object, or reference point, and may be expressed as the distance between two objects, in combination with a direction vector indicating a direction from one object to another object.

As used herein, "location" may refer to a geographical point where an electronic device, other object, or point of interest is positioned, such as a point on the Earth's surface or elsewhere, and may be designated in terms of a geographic coordinate system (e.g., latitude and longitude) or in terms of a position relative to another geographical point or point of interest.

Broadly, wireless signals (e.g., radio frequency signals) sent between two or more electronic devices, may be analyzed to determine spatial parameters. As used herein, "spatial parameters" may refer to information about the placement of an electronic device in the space it occupies. Spatial parameters for an electronic device may include, but are not limited to, any combination of a distance between the electronic device and a point of interest (e.g., another device, an object, a reference point, etc.), an orientation of the electronic device, and a location of the electronic device. As used herein, "localization" may refer to determining one or more spatial parameters of an electronic device.

The wireless signals used to determine spatial parameters of electronic devices may include ultra-wideband (UWB) signals. As used herein "UWB signals" may refer to signals transmitted over a large portion of the radio spectrum (e.g., having a bandwidth greater than 500 MHz or greater than 20% of a center carrier frequency). Using UWB signals to perform localization may be referred to herein as "UWB localization."

Electronic devices, such as the wirelessly locatable tags described herein (or other devices that incorporate the functionality of the tags described herein), may be configured as transmitting devices configured to transmit UWB signals, receiving devices configured to detect UWB signals, or both. Each device may include one or more antennas for transmitting and/or detecting UWB signals. A UWB signal transmitted by a transmitting device propagates in all directions or in one or more directions from a transmitting device, and the transmitted signal may be detected by one or more receiving devices. UWB signals used to determine spatial parameters of electronic devices may be sent as pulses. As used herein, a "pulse," may refer to a rapid, transient change in the amplitude of a signal from a baseline value to a higher or lower value, followed by a rapid return to the baseline value.

Figure 1B:
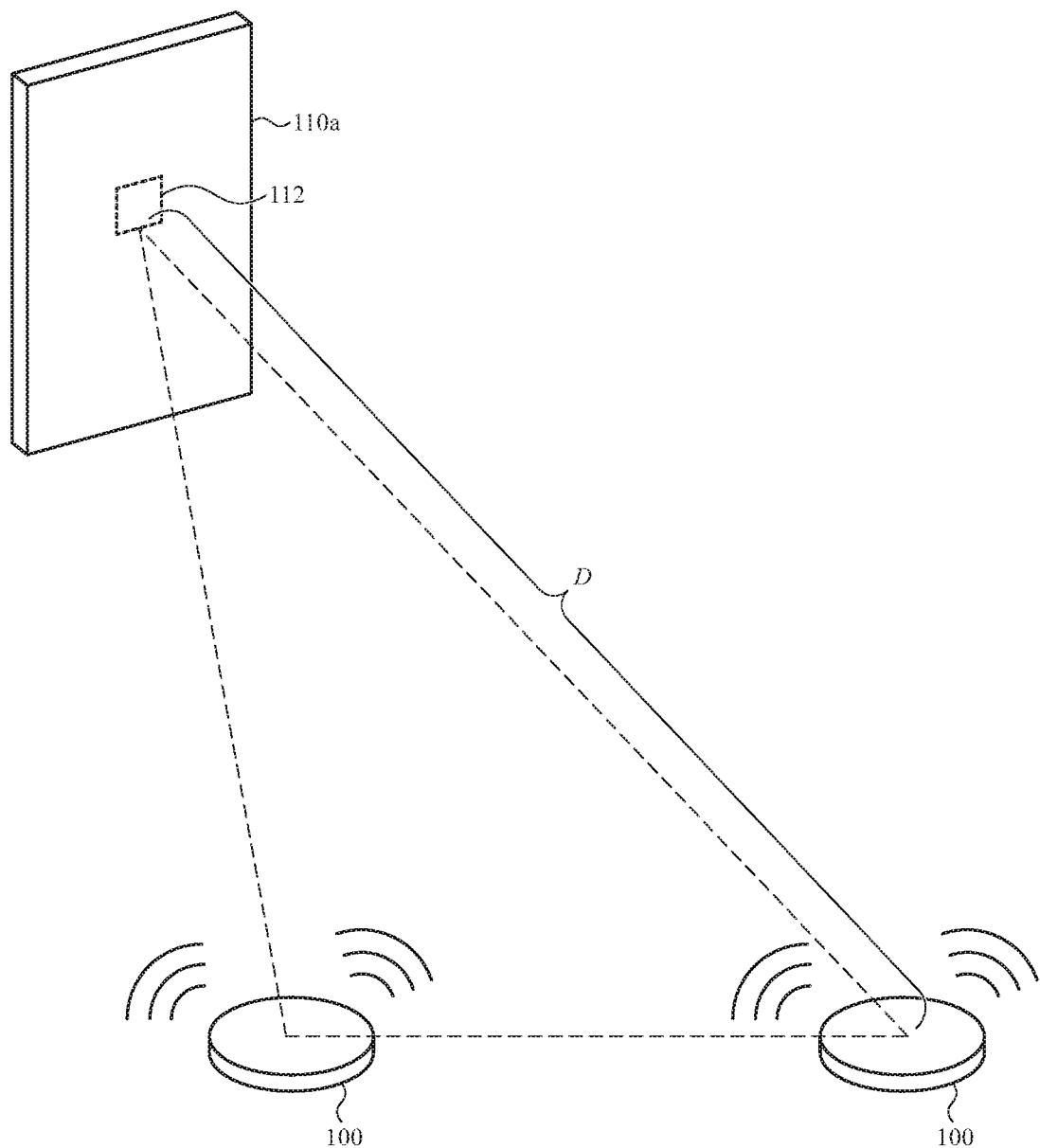
FIGS. 1B-1D depict an example scheme for locating a wirelessly locatable tag.

Turning to FIG. 1B, as noted above, UWB signals (which may also be referred to herein as beacon signals) may be used to determine a distance D between two electronic devices. In particular, UWB signals may be used to determine a distance between a receiving device (e.g., a smartphone) and the tag 100. As noted above, a distance between a receiving device and a transmitting device may refer to a measurement of how far apart the receiving device and the transmitting device are from one another, and may refer to the length of the shortest possible path through space between the receiving device and the transmitting device.

The receiving device 110a (or a device operably coupled to a receiving device) may analyze a UWB signal pulse detected by an antenna 112 of the receiving device 110a to determine the distance D between the receiving device 110a and a tag 100 that transmitted the UWB signal pulse. In particular, the receiving device 110a may determine a time of flight (TOF) of the UWB signal pulse and multiply the TOF by the propagation speed of the signal pulse (e.g., the speed of light) to determine or estimate the distance D between the tag 100 and the receiving device 110a. As used herein, a UWB signal pulse may be a beacon signal or a portion of a beacon signal.

The TOF may be determined by calculating the difference between the transmission time (i.e., the time the signal was transmitted) and the time the signal was detected (also called the time of arrival (TOA)). The transmission time may be included in the detected UWB signal pulse, sent as part of a separate transmission, or known as a result of a previously performed synchronization process between the tag 100 and the receiving device 110a.

Using UWB signals for determining distance may provide numerous advantages, including increased precision in determining TOA and/or TOF. As one example, UWB signals may have shorter wavelengths than other signals, which may reduce the time range in which the signals can be detected. This reduces errors in determining TOA and TOF, which results in more accurate distance estimation.

A single signal may be detected by multiple receiving devices and/or multiple antennas of a single receiving device (e.g., a smartphone), and the signal may be used as described above to determine distances between the tag 100 and each receiving device or antennas. Additionally, multiple signals from different transmitting devices (e.g., tags) may be detected by a single receiving device, and the signals may be used as described above to determine distances between the receiving device and each transmitting device.

Figure 1C:
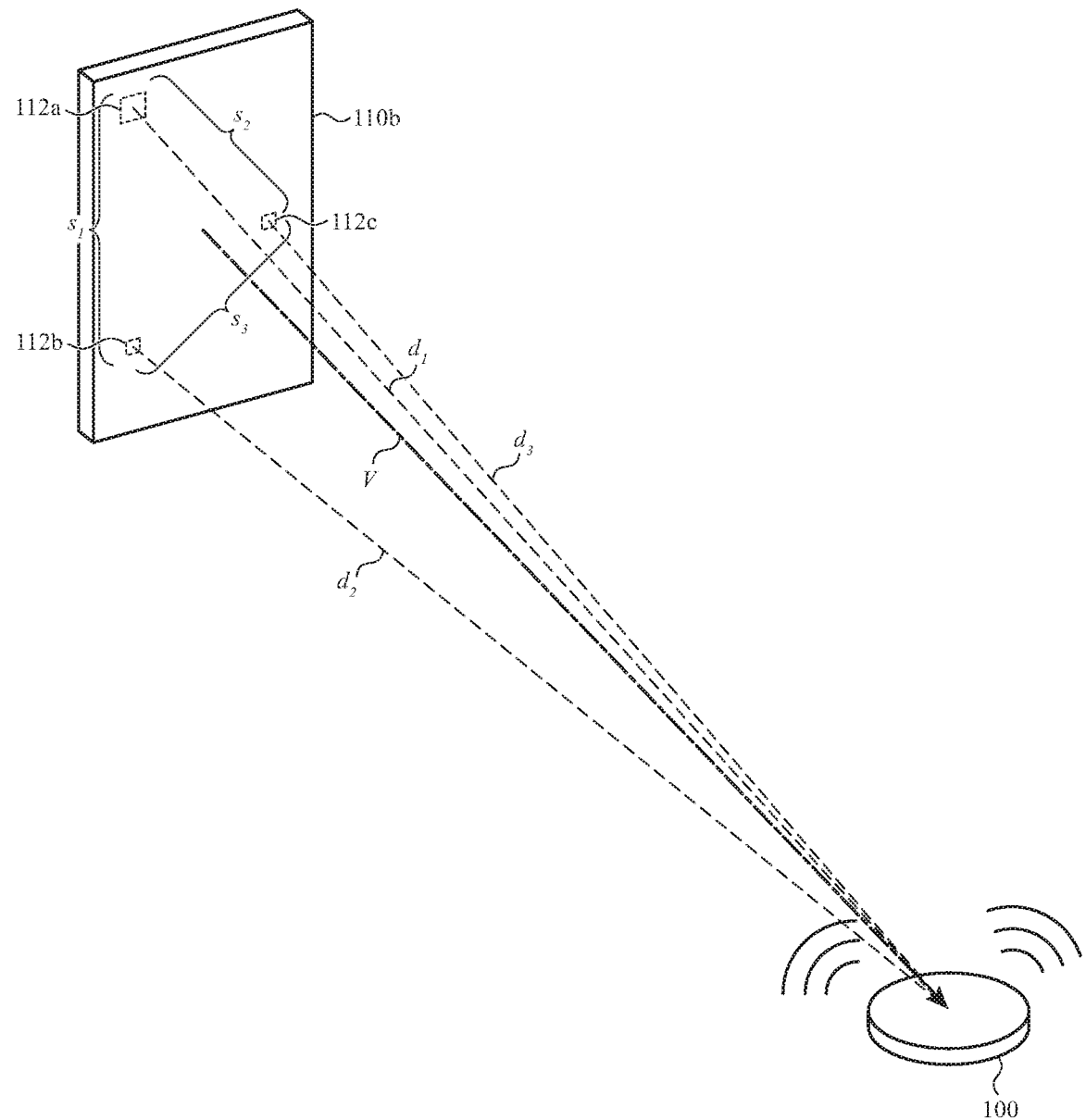

As noted above, UWB signals may be used to determine an orientation of an electronic device relative to a point of interest (e.g., an electronic device, an object, a reference point, etc.). Turning to FIG. 1C, UWB signals may be used to determine an orientation of a receiving device 110b (e.g., a smartphone) relative to a tag 100 (e.g., tags 100). As used herein, the term "orientation" may refer to an altitude or angular position of an electronic device relative to another electronic device, other point of interest, or reference frame. Orientation may be designated in terms of a rotation about one or more axes required to rotate from a current placement to a reference placement. Example measures of orientation may include Euler angles, Tait-Bryan angles (e.g., yaw, pitch, and roll), orientation vectors, orientation matrices, and the like. The orientation of an electronic device relative to a point of interest may also be thought of as a direction to the point of interest with respect to the electronic device.

The receiving device 110b (or a device operably coupled to a receiving device) may analyze a UWB signal pulse detected by multiple antennas of the receiving device 110b to determine an orientation of the receiving device 110b relative to a tag 100 (e.g., a tag 100) that transmitted the UWB signal pulse. As noted above, receiving devices may include multiple antennas. As one example, as shown in FIG. 1C, the receiving device 110b may include three or more antennas e.g., antennas 112a, 112b, 112c positioned on or within the receiving device 110b. The receiving device 110b may determine distances d1, d2, d3 between each antenna and a tag 100 as set forth above. Differences between the distances d1, d2, d3 may indicate the orientation of the receiving device 110b relative to a transmitting device. Using the determined distances d1, d2, d3 and known separation distances s1, s2, s3 between the antennas, a vector V extending from the receiving device 110b to the tag 100 may be determined. The vector V may be expressed in terms of a distance between the receiving device 110 and the tag 100 and a direction of the vector V relative to a reference vector of the receiving device 110b (e.g., a vector normal to a plane shared by the three antennas or any other vector that is fixed with respect to the three antennas). The direction of the vector V may describe the orientation of the receiving device 110a relative to the tag 100.

In some cases, the orientation of the receiving device 110b relative to the tag 100 (or vice versa) may be determined independently of determining the distances d1, d2, d3. The receiving device 110b may determine a direction from the receiving device 110b to the tag 100 (or from the tag 100 to the receiving device 110b) by determining a time difference of arrival (TDOA) of the same UWB signal pulse to the three separate antennas 112a, 112b, 112c of the receiving device 110b. The TDOA for a UWB signal pulse may be determined as the pairwise time difference between the time of arrival of the signal at a first antenna (e.g., antenna 112a) and the time of arrival of the signal at a second antenna (e.g., antenna 112b). One or more pairwise time differences may be determined, and may be used to determine a direction from the receiving device 110b to the tag 100, which, as noted above, may describe the orientation of the receiving device 110b relative to the tag 100. Other methods for determining direction and orientation may also be used, including triangulation, phase difference of arrival (PDOA), and hybrid TDOA/PDOA methods.

The distance between the receiving device 110b and the tag 100 and the relative orientation of the receiving device 110b may define a position of the receiving device 110b relative to the tag 100. As used herein, "position" or "relative position" of an electronic device may refer to the positional relationship of the electronic device in relation to another device, object, or reference point, and may be expressed as the distance between two objects, in combination with a direction vector indicating a direction from one object to another object (e.g., a distance between a receiving device 110b and a tag 100 and a direction vector indicating the direction from the receiving device 110b to the tag 100). For example, the vector V of FIG. 1C may represent a relative position of the tag 100 and the receiving device 110b.

In various embodiments, information about electronic device(s) (e.g., the spatial parameters discussed above) determined using UWB localization may be combined with other information from a variety of sources to determine spatial parameters. An electronic device may include and/or be operably coupled to one or more sensors or devices for determining spatial parameters or data that may be used to determine spatial parameters. Examples of sensors and devices include magnetometers, gyroscopes, accelerometers, optical sensors, cameras, global positioning system (GPS) receivers, and the like.

As one example, an electronic device (e.g., a smartphone) may include or be operably coupled to a GPS receiver configured to determine a location of the electronic device. As noted above, as used herein, "location" may refer to a geographical point where an electronic device is positioned, such as a point on the Earth's surface or elsewhere, and may be designated in terms of a geographic coordinate system (e.g., latitude and longitude) or in terms of a position relative to another geographical point or point of interest. The position of a transmitting device (e.g., tag) relative to a receiving device may be determined using UWB localization as discussed above. A location of the transmitting device may be determined using a location of the receiving device determined using GPS and the position of the transmitting device relative to the receiving device determined using UWB localization.

As another example, an electronic device may include or be operably coupled to a magnetometer or an accelerometer that may be used to determine an orientation of the electronic device relative to the earth. For example, a magnetometer may be used to determine an orientation of the electronic device relative to magnetic north or another known source of magnetic flux. Similarly, an accelerometer may be used to determine an orientation of the electronic device relative to the direction of gravitational acceleration (e.g., inward with respect to the earth's surface). A direction from the receiving device to the transmitting device relative to the receiving device may be determined using UWB localization as discussed above. The direction from the receiving device to the transmitting device relative to the earth or another known point of interest may be determined by combining the orientation of the electronic device relative to earth determined using a magnetometer or accelerometer with the direction from the receiving device to the transmitting device relative to the receiving device determined using UWB localization.

In some cases, the same antenna(s) are used for transmitting and detecting UWB signals. In some cases, the antenna(s) used for transmitting UWB signals are different from the antenna(s) used for detecting UWB signals. The antenna(s) may be operably coupled to one or more transmitters, receivers, processing units, or the like that may be used to generate transmitted signals and/or process detected signals.

Figure 1D:
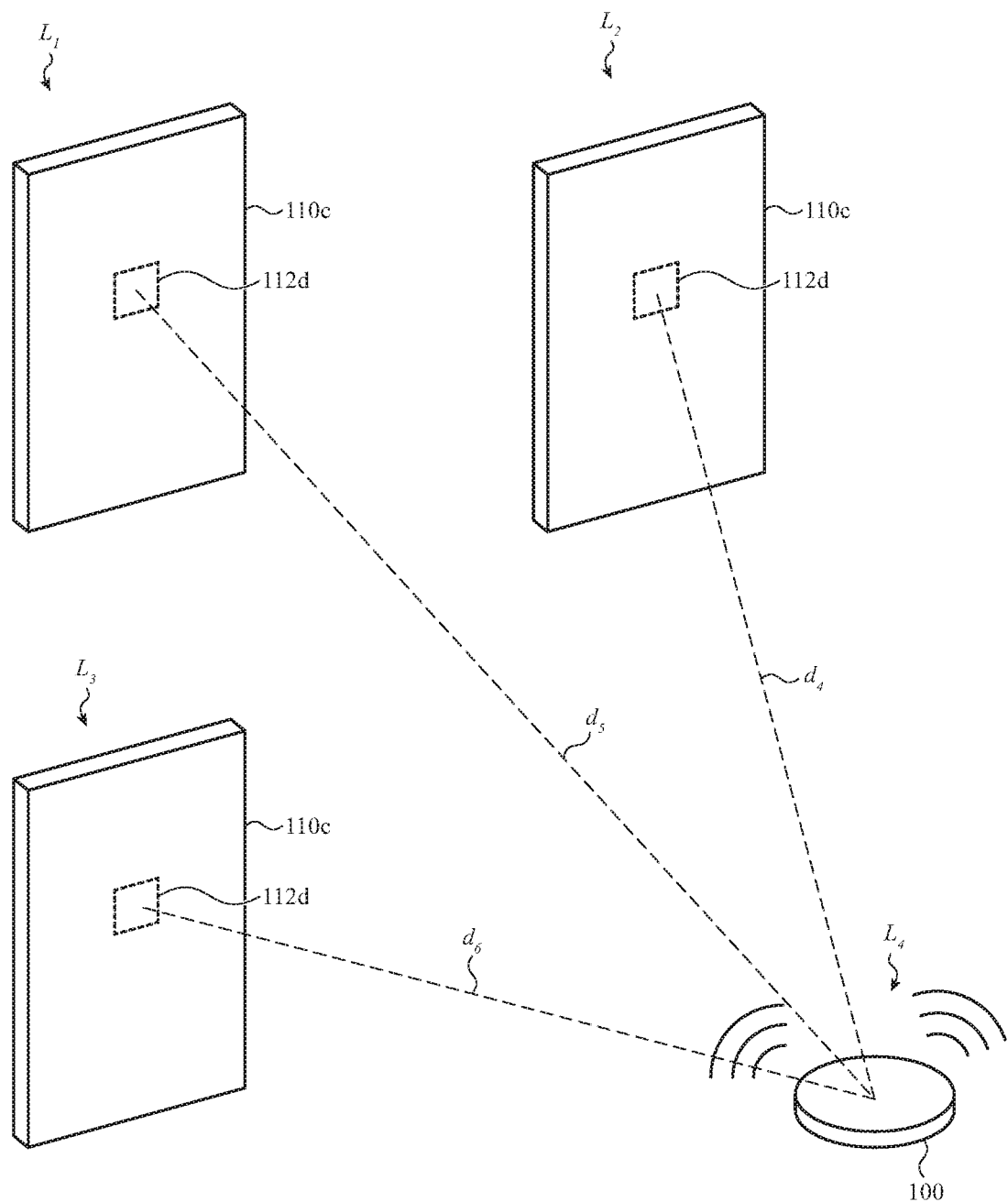

A location of the tag 100 may also be determined by a receiving device 110c by determining the distance between the receiving device 110c and the tag 100 when the receiving device 110c is at multiple different locations. This process triangulates the location of the tag 100 without using multiple onboard antennas and TDOA analysis of a pulse from the tag 100. FIG. 1D illustrates how the location of the tag 100 is determined using this technique (which may be referred to as synthetic aperture).

As described above, the tag 100 may emit a pulse (e.g., a UWB signal pulse) that is detectable by an antenna 112d, and the receiving device 110c may analyze the pulse (e.g., using TOF) to determine the distance from the receiving device 110c to the tag 100. As shown in FIG. 1D, in order to determine the location of the transmitting device, the receiving device 110c may determine multiple distances (e.g., distances d4, d5, and d6) to the tag 100 when the receiving device 110c is at multiple locations (e.g., L1, L2, and L3). Because the location of the receiving device 110c at locations L1, L2, and L3 is known (as determined by an onboard GPS, accelerometer(s), and/or other positioning systems) and the distances between the receiving device 110c and the tag 100 are also known, the receiving device 110c can determine, using triangulation, the location L4 of the tag 100. Further, using an onboard magnetometer, accelerometer, and/or other systems, the receiving device 110c can determine its orientation relative to the determined location of the tag 100. The orientation of the receiving device 110c relative to the tag 100 together with the location of the tag 100 provides a full complement of spatial parameters of the tag 100 to facilitate the functionalities described herein.

With reference to the process described in FIG. 1D, the transmitting device's location may be determined once the receiving device 110c determines at least three distance measurements between the receiving device 110c and the tag 100. In some cases, once the location of the tag 100 is established using at least three distance measurements, the receiving device 110c may perform more distance measurements at additional locations of the receiving device 110c. These subsequent measurements may be used to refine and/or update the determined location of the tag 100, or otherwise to improve the accuracy of the location determination.

Figure 2:
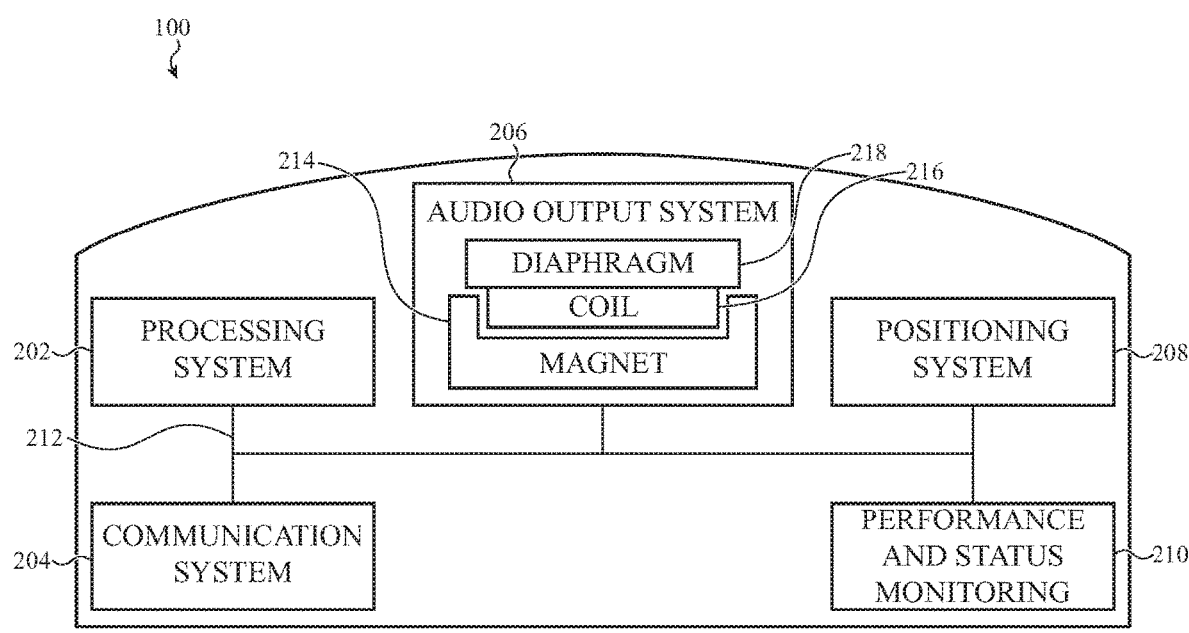
FIG. 2 depicts an example schematic view of a wirelessly locatable tag.

FIG. 2 depicts an example schematic view of the wirelessly locatable tag 100. As shown in an example schematic view in FIG. 2, a wirelessly locatable tag 100 may include a processing system 202, a communication system 204, an audio output system 206, a positioning system 208, and a tag performance and status monitoring system 210 communicatively coupled with each other via a system bus 212. A wirelessly locatable tag may also include a power supply, a memory, a display, and an input/output mechanism. The processing system 202, communication system 204, audio output system 206, positioning system 208, and performance and status monitoring system 210 may correspond to and/or be instantiated by components of a device 700, described with respect to FIG. 7, which may be an embodiment of or otherwise correspond to the tag 100. For example, the audio output system 206 may correspond to or be an embodiment of the audio output system 710. As another example, the performance and status monitoring system 210 may be instantiated by the processing units 701, memory 702, communication channels 704, the audio output system 710, and/or other components or systems of the device 700.

A processing system 202 may be implemented as any electronic device capable of processing, receiving, or transmitting data or instructions. By way of a non-limiting example, a processing system 202 may be a microprocessor, a microcontroller, a digital signal processor, a central processing unit (CPU), a system-on-chip (SOC), an integrated circuit (IC), an application-specific integrated circuit (ASIC), a field-programmable gate array (FPGA), and so on. Accordingly, the term "processing system" and similar terms and phrases are meant to encompass a single processor or processing unit, multiple processors, multiple processing units, or other suitably configured computing element or elements.

A communication system 204 may include at least one transceiver and/or at least one antenna. A communication system 204 may be used to communicate with other devices, such as devices 102 and/or 106 using a wireless communication protocol, for example, Bluetooth, ultra-wideband, 3G, 4G, 5G, 6G, Wi-Fi, WiMAX, and so on. A wirelessly locatable tag 100 may transmit to and/or receive from devices 102 and/or 106 location reports via a communication system 204. A wirelessly locatable tag 100 may also send a wireless beacon and/or signal via Bluetooth, ultra-wideband, and/or other wireless communication protocol for determining a position of the tag with respect to any of the devices 102 and/or 106, a location of the tag, an orientation of the tag, and so on, as described herein with respect to FIGS. 1B-1D.

The communication system 204 may also include a near-field communication (NFC) antenna. The NFC antenna may be configured to wirelessly communicate with other devices. For example, the NFC antenna may cause other devices to perform certain actions, such as display information about the tag 100, send a location report about the tag 100 to a server 104 or other device, or the like. The NFC antenna may be or may include a conductive coil or other conductive structure. As noted, the NFC antenna may also be used to detect an electrical response or characteristic of a conductive coil of an audio output system to determine an operational status of the audio output system.

An audio output system 206 may be configured to produce an audible output, as described herein. The audible output may be produced to help a user locate a lost or missing tag (and the item to which the tag is attached). For example, if a user has lost a set of keys to which a tag is attached, the user may initiate an audio output mode in which the tag will emit a sound (e.g., one or more beeps or tones) to allow the user to physically find the object by finding the source of the sound. The audio output system may also be used to provide other information, such as a battery level indication (e.g., when a battery of the tag needs to be replaced), to indicate a status of the tag, or the like. In some cases, a tag may emit sound when it has been reported as "lost," which may help the user or other individuals locate the lost tag and return it (and any associated property) to its owner.

In some cases, the audio output system 206 produces an audio output (and/or initiates an audio output mode) in accordance with a determination that the tag has moved and has not communicated with a particular remote electronic device for a predetermined duration (e.g., 1 hour, 8 hours, 1 day, 2 days, or another suitable duration). For example, if a tag is moving and it is not near its owner, it may make a sound so that other individuals can locate the tag (and/or attached item) using the audible output, and return the tag to its owner. The tag may determine whether or not it has moved using an accelerometer, inertial measurement unit, or other suitable system of the tag.

The audio output system 206 may include a magnet 214, a coil 216, and a diaphragm 218 to produce an audible output. A magnet 214 may be a permanent magnet. In some cases, a magnet 214 may be a temporary magnet. A coil 216 may be a voice coil, which may be set in motion by passing an electric current through the voice coil. More particularly, the coil 216 may be set in motion by the coil 216 carrying an electric current while within a magnetic field of a magnet 214. With a coil 216 set in motion, a diaphragm 218 may also move and sound waves (e.g., an audible output) may be generated.

In some cases, the diaphragm may be a portion of a housing of the wirelessly locatable tag 100. For example, the coil 216 may be glued to an interior surface of a housing of the tag, and may cause a portion of the housing of the tag to move along with movement of a coil 216. Movement of the housing of the tag may be heard as an audible output. Thus, the housing itself, or a portion thereof, may operate as the diaphragm 218. In some cases, the diaphragm 218 is a separate component from the housing (e.g., the diaphragm, coil, and magnet may be part of a speaker). In some cases, the audio output system 206 also generates haptic outputs by causing the tag to vibrate. In some cases, the audio output system 206 may use a different mechanism or system for producing audible outputs. For example, the audio output system 206 may user a piezo-based speaker.

In some cases, an audio output system 206 may be activated to produce an audible output and/or a haptic output in response to activation of the audio output system 206 by a user using any of the devices 102 and/or 106. In some cases, an audio output system 206 may be activated upon determining a distance between the tag 100 and any of the devices 102 and/or 106 exceeds a preconfigured distance threshold. In some cases, the audio output system 206 may be activated if a certain set of conditions is satisfied. The conditions may specify an absolute location of the tag 100, a relative location or position of the tag relative to another device, a motion or motion history of the tag (e.g., whether the device has moved, whether the devices has moved within a certain time window, etc.), a duration that the tag has been in a particular mode, or other conditions (and/or combinations of these or other conditions).

A positioning system 208 of the tag may determine one or more spatial parameters of a tag and/or any of the devices 102 and/or 106. As described herein, spatial parameters may include, but are not limited to, a distance, a position, a location, and/or an orientation in absolute space and/or relative to an object, and so on. Accordingly, a tag may send its location data to any of the devices 102 and/or 106 to inform of its current location and/or position with respect to any of the devices 102 and/or 106 or as a geographical point using a geographic coordinate system. Since how a tag may be located is described in great detail using FIGS. 1B-1D, those details are not repeated for brevity. However, a person skilled in the art may implement a positioning system 208 as described herein in accordance with some embodiments.

A tag performance and status monitoring system 210 may check the health and/or operational status of the tag (and/or its subsystems or functions) and take an action according to a determination made regarding the health of the tag. In one example, a location determining function of the tag may be damaged or broken. In another example, an audio output system may be damaged or broken, or otherwise rendered nonoperational. In some cases, a corruption in software instructions may also cause failure in generating audio and/or haptic outputs or other functionalities of the tag.

In some cases, one or more components of an audio output system may become damaged or broken, or the audio output system may generally cease functioning as intended or expected. For example, as described herein, a foreign object (e.g., sand, dirt, lint) may become lodged between components of an audio output system, or one or more of the components of the audio output system may become detached or broken (e.g., due to the tag being dropped), or a diaphragm may be broken or otherwise prevented from moving. In some cases, a software malfunction on a tag may also prevent generation of audio output and/or a haptic output. Accordingly, a tag performance and status monitoring system 210 may periodically and/or aperiodically check health of a tag (and/or its subsystems or functions). In some cases, the tag performance and status monitoring system 210 performs an audio output system operational check at certain intervals and/or in response to certain events. For example, the tag performance and status monitoring system 210 may perform an audio output system operational check (e.g., to determine whether the audio output system fails an audio output performance criteria, as described herein) twice per day, once per day, once per week, or at another periodic interval. As another example, the tag performance and status monitoring system 210 may perform the audio output system operational check each time the battery of the tag is changed, or each time the tag is reported as "lost" or otherwise transitioned to a "lost" mode. Other triggering events are also contemplated. In some cases, both periodic and event-driven operational checks are performed for the audio output system.

In some cases, an NFC antenna (or another type of antenna or conductive component) may be used to determine if an audio output system 206 and/or one or more components of an audio output system 206 are damaged, broken, and/or otherwise not operating as intended or expected. The NFC or other antenna may be a component of the communication system 204, and may provide both communication functions (e.g., as part of the communication system 204) and audio output system monitoring functions (e.g., as part of the tag performance and status monitoring system 210). For example, an NFC antenna of the tag 100 may intersect or otherwise be positioned in or proximate a magnetic field of the audio output system 206 (e.g., a magnetic field generated by the magnet 214). As described herein with reference to FIGS. 4A-4B, the NFC antenna may detect different electrical responses or characteristics when an audible output is commanded, depending on whether the audible output is actually produced. For example, if the coil 216 moves (indicative of the coil being present and working properly to move the diaphragm 218), the antenna may detect a certain electrical response or characteristic, and if the coil 216 does not move, the antenna may detect a different electrical response or characteristic.

In some cases, the status of an audio output system or components thereof may be determined using a voice coil voltage monitor, a mesh circuit on a housing of a tag, a light sensor, a Hall effect sensor, and so on. For example, when flow of an electric current through a coil 216 is activated, monitoring voltage at various points of a coil 216 may help identify whether the coil 216 is broken, damaged, or otherwise not operating properly. A tag performance and status monitoring system 210 may be configured to verify if voltage at various points of a coil 216 are within a particular voltage range according to an electric current induced to flow through a coil 216. In some cases, a mesh circuit on a housing of a tag may be used to determine whether a housing of a tag has become broken or damaged. For example, an electric current flowing through the mesh circuit when a tag is broken or damaged may be different from an electric current flowing through the mesh circuit when the tag is not broken or damaged. Accordingly, a tag performance and status monitoring system 210 may determine that a tag is broken, damaged, and/or otherwise not operating properly using one or more techniques and/or systems (and/or combinations thereof).

In some cases, a Hall effect sensor may be used to detect and measure a change in magnitude of a magnetic field as a result of a tag being broken or damaged. By way of a non-limiting example, a Hall effect sensor on one portion of a housing of a tag may detect the presence or absence of a magnet on another portion of the housing. If the Hall effect sensor detects a change in magnetic field (e.g., due to the magnet being moved as a result of the tag being damaged or broken), the tag performance and status monitoring system 210 may determine that the tag is broken or damaged.

In some cases, a light sensor inside a housing of a tag may also be used to detect that a tag has become damaged or broken. For example, a light sensor positioned inside the housing of a tag may generally remain unexposed to light unless the tag is broken (e.g., unless the housing is broken open). Accordingly, if a light sensor detects light that satisfies a condition (e.g., above a threshold intensity), the tag performance and status monitoring system 210 may determine that a tag is likely to have become broken or damaged.

In some cases, an accelerometer, may be used to determine if an audio output system 206 and/or one or more components of an audio output system 206 are damaged, broken, and/or otherwise not operating properly. For example, an accelerometer attached to a housing of a tag may be used to determine movement of a housing as a result of a diaphragm or other component moving during sound generation. An absence of movement of a housing of a tag while sound is supposed to be generated (e.g., when an electric current is induced to flow through a coil 216 or an audio output is otherwise commanded) may indicate a tag is broken or damaged, or a component of an audio output system 206 is broken or damaged.

In some cases, a microphone inside a housing of a tag may be used to detect sound, and an absence of sound while an electric current (e.g., an audio signal) is induced to flow through a coil 216 may indicate a tag is broken or damaged, or a component of an audio output system 206 is broken or damaged.

Figure 3A:
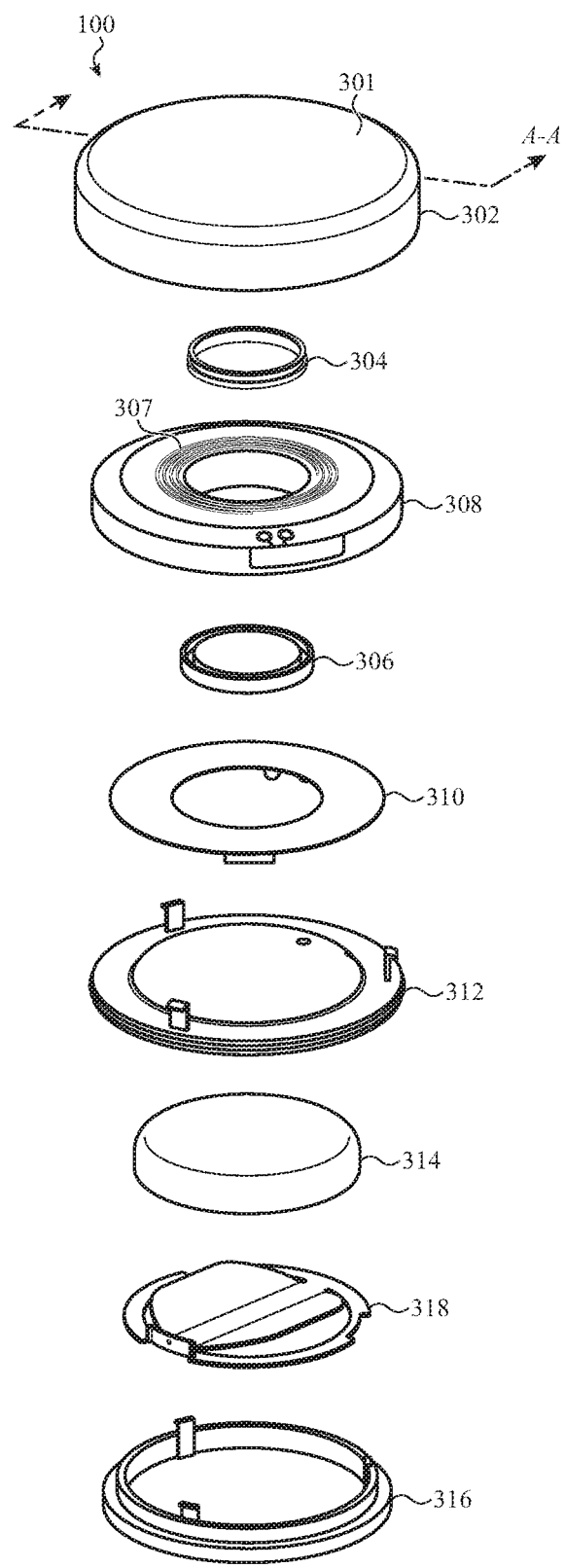
FIG. 3A depicts an exploded view of an example wirelessly locatable tag.
Figure 3B:
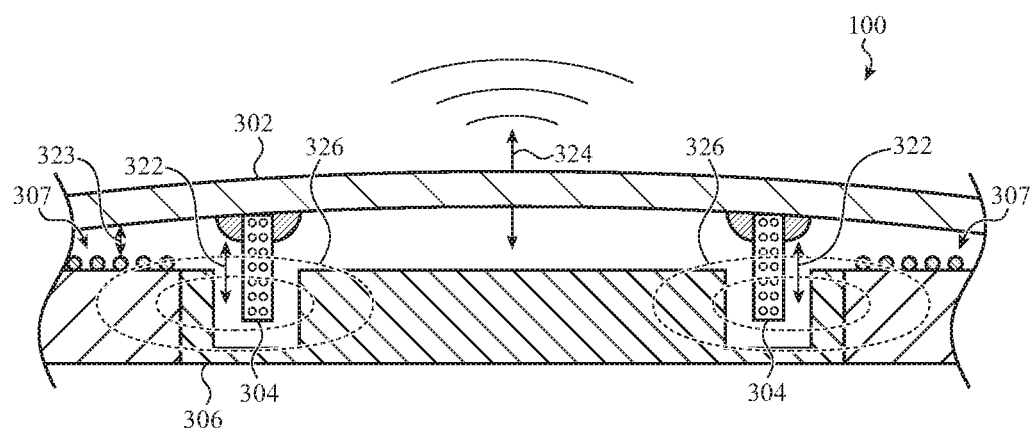
FIGS. 3B-3C depict a cross-sectional view of the example wirelessly locatable tag of FIG. 3A.
Figure 3C:
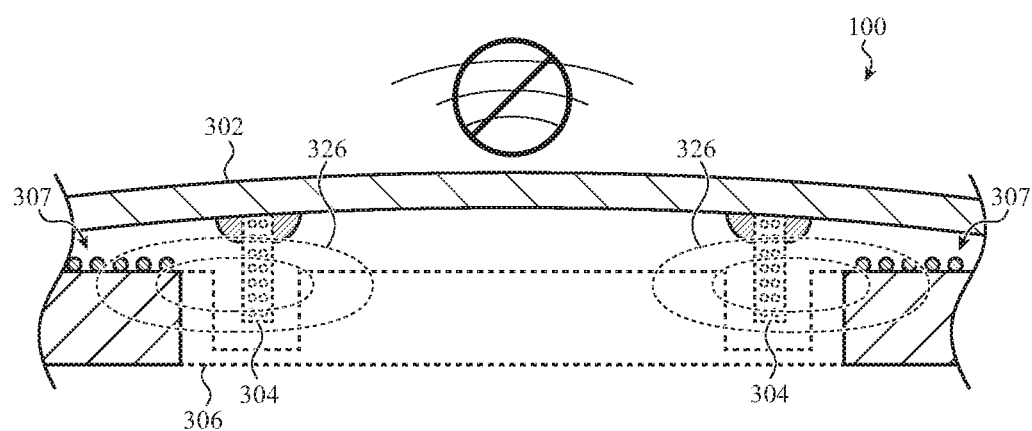

FIG. 3A is an exploded view of the tag 100, and FIGS. 3B-3C depict a cross-sectional view of the tag 100 as viewed along line A-A in FIG. 3A. As shown in FIG. 3A, the tag 100 includes a top housing member 302 (also referred to herein as an upper housing member) and a bottom housing member 316 (also referred to herein as a lower housing member), which together may form at least part of an enclosure of the tag. The top and bottom housing members 302, 316 may enclose or house components of the tag 100, as described herein.

The top housing member 302 may define a top exterior surface 301 of the tag 100. The top exterior surface 301 of the tag 100 may be an unbroken, seamless surface. For example, the entire top exterior surface 301 of the tag 100 may be defined by a single, unitary piece of material (uninterrupted by displays, buttons, openings, additional housing components, or the like). Accordingly, the top housing member 302 may define an entirety of the top exterior surface of the tag 100, and may be defined by a unitary structure (e.g., a unitary or single-piece polymer structure). The top housing member 302 may also define a peripheral side wall defining a peripheral side surface of the tag 100.

Further, as described herein, a portion of the top housing member 302 that defines the top exterior surface 301 may act as a diaphragm of an audio system that produces audible and/or haptic outputs. For example, an audio system may move a portion of the top housing member 302 so that the moved portion of the top housing member 302 produces the pressure waves that correspond to the audible output. As noted above, the motion of the top housing member 302 may also be used to produce haptic outputs.

In some cases, substantially the entire exterior of the tag 100 may be defined by two components, the top housing member 302 and the bottom housing member 316. In such cases, the tag 100 may lack features such as displays (and associated housing components such as transparent covers), speaker/microphone openings, buttons, lenses, light sources, and the like. While some tag embodiments may include such components, embodiments that lack them may have better environmental sealing and energy efficiency, may be cheaper to manufacture, and may be simpler to use as compared to devices that include such features or components.

The bottom housing member 316 may define a bottom exterior surface of the tag 100. The bottom housing member 316 may be removable from the remainder of the tag 100 to facilitate removal and replacement of a battery 314. The bottom housing member 316 may also be referred to as a battery door. The battery 314 may be any suitable type of battery, such as a button cell battery.

The tag 100 may also include an antenna assembly 308. The antenna assembly 308 may have one or more antennas attached to or otherwise integrated therewith. For example, the antenna assembly 308 may include separate (and/or shared) antennas for near-field wireless communications protocols, UWB protocols, Bluetooth, Wi-Fi, cellular protocols, or the like. In some cases, some or all of the antennas are integral to the antenna frame of the antenna assembly. For example, the antenna assembly 308 may include an antenna 307. The antenna 307 may be positioned around or proximate a coil 304 of an audio output system. The coil 304 may correspond to or otherwise be an embodiment of the coil 216. In some cases, the antenna 307 is or includes a loop or a coil of conductive material, such as conductive wire, conductive traces (e.g., conductive material deposited or otherwise formed on a substrate, on the antenna assembly 308, or another suitable structure), or the like. In some cases, the antenna 307 may be formed via a laser direct sintering process in which a polymer material of the antenna assembly 308 may be doped with a metallic material (or other suitable dopant), and a laser may be applied to the component to form regions where the metallic material or dopant is exposed or otherwise activated. These regions may then be metallized using a plating process in which the plating metal adheres to and/or grows on the laser-treated regions.

The antenna 307 may be a near-field wireless communication antenna. For example, the antenna 307 may be configured for any suitable type or protocol of near-field wireless communications, including but not limited to near-field communications (NFC) protocols, radio frequency identification (RFID) protocols, or any other suitable type or protocol.

In some cases, the antenna 307 is configured to cause nearby devices to display information. For example, a person may bring a phone, watch, tablet computer, or other device nearby the tag 100 (either intentionally or unintentionally), thereby establishing a communication link between the tag 100 and the person's device. The communication link may cause the person's device to display various types of information or take other actions. For example, the person's device may receive information, via the antenna 307, stating whether or not the tag 100 has been reported lost, information about how to handle the tag 100 (or object to which the tag is attached), information about how to contact the owner of the tag 100, or the like. The antenna 307 may also be used to initiate an initialization process between the tag 100 and another device, such as any of the devices 102 and/or 106. Other information may be communicated, or actions triggered, via the antenna 307.

At least a portion of the top housing member 302 may be set apart from the antenna assembly 308 by a gap, such as the gap 323 in FIG. 3B. The gap 323 may allow the portion of the top housing member 302 to be moved to produce haptic and audio outputs without the antenna assembly 308 interfering with the audible or haptic output. In some cases, the size of the gap is greater than a maximum target deflection of the top housing member 302 during audible and/or haptic outputs. Thus, for example, if the tag 100 is configured to produce audio and/or haptic outputs having a certain characteristic (e.g., a maximum or target amplitude, volume, frequency, or other property), the size of the gap 323 may be selected to be greater than the deflection of the top housing member 302 that results from those audible and/or haptic outputs. In some cases, the maximum size of the gap 323 (e.g., the distance between the topmost surface of the antenna assembly 308 and the bottom surface of the top housing member 302) may be less than or equal to about 500 microns, 400 microns, 300 microns, 200 microns, 100 microns, or 50 microns.

The tag 100 also includes an audio system (e.g., corresponding to and/or including the audio output system 206) that includes the coil 304 coupled to the top housing member 302. The coil 304 may be proximate a magnet assembly 306 (e.g., positioned in a magnetic field produced by the magnet assembly 306). The magnet assembly 306 may correspond to or be an embodiment of the magnet 214. Further, a portion of the top housing member 302 may operate as the diaphragm 218. When an audio signal is applied to the coil 304, Lorentz forces may be produced which, in turn, cause the coil 304 to impart forces to the top housing member 302 that cause the top housing member 302 to move, oscillate, vibrate, or otherwise produce an audible and optionally tactile output. In some cases, the top housing member 302 locally deflects or deforms to produce the audible and/or tactile output. Appropriate clearances may be provided between the top housing member 302 and an antenna assembly 308 to allow the top housing member 302 to move a distance and in a manner that is sufficient to produce the target audio and/or tactile output, as described above. Other types of audio systems may be used instead of or in addition to the audio system shown in FIG. 3A, such as piezoelectric elements, a ported speaker module, or the like. As described herein, the antenna 307 may be used by or be part of the performance and status monitoring system 210 to determine whether the coil 304 is producing an expected electrical and/or magnetic phenomenon when an audio output is commanded.

In some cases, the audio system may act as an input system (e.g., a button) in addition to acting as an audible and haptic output system. For example, deflections of the top housing member 302 (above the coil 304 and magnet assembly 306) may result in movement of the coil 304 in the magnetic field of the magnet assembly 306, thereby causing a detectable current to flow in the coil. This may be used to trigger the tag 100 to take some action (e.g., enter an initialization mode, cease an audio output, enter a "found" mode, etc.). In some cases, a separate sensor or switch (e.g., a force sensor, a dome switch) may be used to detect inputs to the device. For example, a sensor or switch may detect deflection or deformation of the top housing member 302 as a result of a user pressing on or squeezing the tag.

The tag 100 may include a circuit board 310. The circuit board 310 may include a substrate (e.g., a printed circuit board substrate) with electrical components coupled thereto. Example electrical components include, for example, processors, memory, sensors (e.g., temperature sensors, accelerometers, magnetometers, gyroscopes, optical sensors, light sensors, microphones, pressure sensors, barometric sensors, or the like), conductive elements (e.g., conductive traces), and the like. A battery connector may be conductively coupled to the circuit board 310 and configured to conductively couple to a battery of the tag 100 to provide electrical power to the electronic components of the tag 100.

The bottom housing member 316 may be removable from the top housing member 302 to facilitate removal and replacement of the battery 314. The bottom housing member 316 may be removably coupled to the tag via a latching or other engagement system that prevents or inhibits unintentional removal of the bottom housing member 316. The battery 314 may be positioned in a cavity defined by the enclosure. In some cases, frame member 312 defines a battery cavity. The frame member 312 may be coupled to the antenna assembly 308 or another component or structure of the device.

The tag 100 may also include a compliant member 318 between the bottom housing member 316 and the battery 314 to bias the battery 314 into the battery cavity of the tag 100 and against the battery connector that electrically couples the battery 314 to the electrical components of the tag 100. The compliant member 318 may be or may include a spring (e.g., a leaf spring, a coil spring), a polymer (e.g., a foam or elastomer pad), or any other suitable compliant member that biases the battery towards the tag 100.

As noted above, the audio output system of a tag (e.g., the audio output system 206, FIG. 2) may be configured to produce audio outputs that can be used to help a user locate the tag 100. For example, when a user is attempting to locate a lost tag 100 (and thus locate any object attached to or associated with the lost tag), the user may use a smartphone to wirelessly command the tag 100 to produce an audible sound such as a beeping or other audible tone (e.g., a constant tone, a song, a series of tones or beeps, etc.). The user can then attempt to find the tag 100 by listening for the audible sound. The audio output system may be any suitable component or system for producing sound, such as a voice coil speaker, a piezoelectric speaker, or the like. Example audio systems are described herein.

In some cases, the audio output system produces audio outputs by moving a portion of the top housing member 302 like a diaphragm or cone of a speaker. For example, with reference to FIG. 3B, the audio output system or a portion thereof (e.g., the coil 304) may be attached to the inside surface of the top housing member 302 to directly apply forces on the top housing member 302 that cause the top housing member 302 to flex, deform, or otherwise move to produce audio output. As shown in FIG. 3B, for example, the coil 304 may be coupled to the inside surface of the top housing member 302, and may be positioned in a magnetic field 326 produced by the magnet assembly 306. When an audio signal is supplied to the coil 304, the electrical signal in the coil 304 interacts with the magnetic field 326 to result in forces (e.g., Lorentz forces) acting on the coil. These forces, as illustrated by arrows 322, are imparted on the top housing member 302, thereby causing a portion of the top housing member 302 to move, flex, or otherwise produce the audible output, as illustrated by arrows 324.

As shown in FIG. 3B, the antenna 307 (e.g., an NFC antenna) may be positioned in the magnetic field 326, and electrical characteristics of the antenna 307 may change and/or be effected by the magnetic field 326 and/or changes in the magnetic field 326. For example, as described with respect to FIG. 4A, when the audio signal is supplied to the coil 304, the effect of the electrical current in the coil 304, as well as the effect of the coil 304 moving in the magnetic field 326, may induce a particular electrical response in the antenna 307. This electrical response or characteristic may be indicative of the audio output system operating as intended. For example, it may be indicative of the coil 304 receiving the audio signal, and the coil 304 (and thus the diaphragm) moving as expected in response to the audio signal.

FIG. 3C depicts a scenario in which the audio output system has become damaged, broken, or is otherwise not functioning as intended. The coil 304 and the magnet 306 are shown in broken lines in FIG. 3C to represent the damaged, broken or otherwise malfunctioning audio system, though this does not necessarily indicate that those particular components are missing. In this case, when an audio output is commanded, the expected audio output is not produced.

The failure to produce an audio output when one is commanded (e.g., when an audio signal is supplied to the coil) may result from any of multiple possible conditions. For example, the coil 304 may be damaged or may have become detached from a signal source, or the magnet 306 may have become broken, displaced, demagnetized, or the like, or the coil or housing may have become bound relative to the magnet (or combinations or these or other conditions). In such cases, when an electrical signal that should produce an audible output is provided to the coil 304 (or attempted to be provided to the coil), the coil 304 may not move, resulting in a different electrical and/or magnetic response being detected by the antenna 307. As described herein, the tag 100 (e.g., the tag performance and status monitoring system 210) may determine whether the audio output system fails an audio output performance criteria when provided with an audio signal.

As described above, an example technique for determining whether an audio output system fails an audio output performance criteria includes detecting an electrical response induced by the conductive coil of an audio output system (e.g., the coil 304), and determining if the electrical response is indicative of the conductive coil failing to move according to an expected motion for an audible output corresponding to a particular audio signal. As noted above, this may result from the coil becoming shorted or electrically decoupled from an audio signal generator, or from a magnet being broken or demagnetized, or from a speaker system being bound or seized by debris, or the like.

The electrical response induced by the conductive coil may be detected by an NFC antenna, such as the NFC antenna 307. For example, the NFC antenna may be positioned at least partially within the magnetic field produced by the magnet 306, and when an audio signal is provided to the conductive coil, the interaction between the audio signal (e.g., electrical current) in the conductive coil and the magnetic field may cause a current, voltage, or other electrical response to be induced in the NFC antenna 307.

Figure 4A:
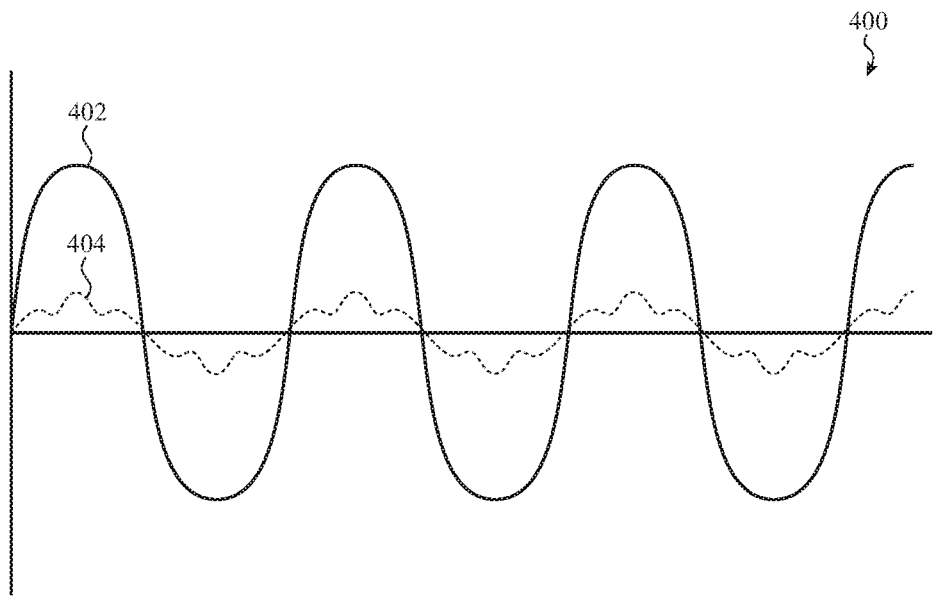
FIG. 4A depicts an example voltage over time diagram when a coil of an example wirelessly locatable tag is dynamic.

FIG. 4A depicts a plot 400 showing a voltage of an NFC antenna (or other suitable conductive coil or structure) over time when an audio signal is provided to the conductive coil of an audio output system (e.g., the coil 304) when the audio output system is operational (e.g., when the conductive coil is set in motion due to an electric current provided to the coil 304 while it is in a magnetic field of a magnet assembly 306). As shown in FIG. 4A, the plot 400 shows voltage over time corresponding to an audio output signal 402 provided to the coil 304, and an induced voltage 404 that is induced in the NFC antenna during the audio output. The induced voltage 404, which is an example electrical response induced by the conductive coil, may have a distinctive or detectable pattern or other characteristic that reflects the correct operation of the audio output system. For example, the induced voltage 404 may reflect both the effect of the audio output signal being passed through the conductive coil in the magnetic field, and the effect of the conductive coil moving within the magnetic field (e.g., the motion that ultimately produces the audible output). As described herein, a characteristic of the induced voltage 404 may be used to determine whether the audio output system is operational.

Figure 4B:
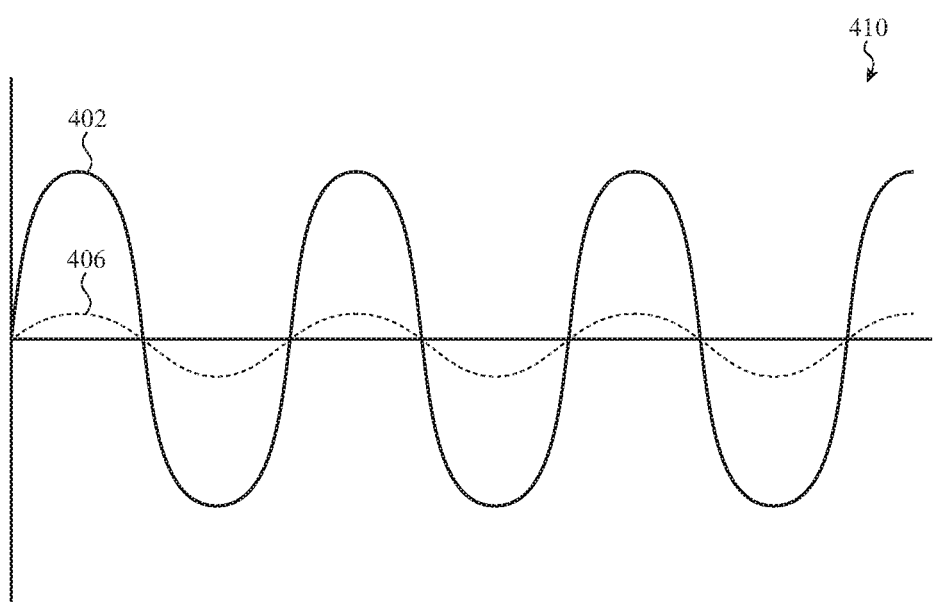
FIG. 4B depicts an example voltage over time diagram when a coil of an example wirelessly locatable tag is static.

FIG. 4B depicts a plot 410 showing voltage of an NFC antenna over time when an audio signal is provided to the conductive coil of an audio output system (e.g., the coil 304) when the audio output system is not operational (e.g., when no magnetic field is present due to a defective magnet or other condition). As shown in FIG. 4B, the plot 410 shows voltage over time corresponding to the audio output signal 402 provided to the coil 304, and an induced voltage 406 that is induced in the NFC antenna during the expected audio output time. Under these conditions, the induced voltage 406 differs from the expected induced voltage in a detectable way. As a specific example, FIG. 4B may represent the induced voltage 406 when no magnetic field is present (e.g., the magnet 306 is demagnetized or broken or misaligned relative to the coil) or when the conductive coil is restricted from moving (e.g., due to debris in the device). In this example, the induced voltage 406 reflects the effect of the audio output signal being passed through the conductive coil, but does not reflect the effect of any motion of the conductive coil, because no motion occurs. Rather, the conductive coil remains stationary even when the audio signal is provided to the coil (or to the audio output system more generally). Accordingly, the tag 100 can determine, based on the properties of the induced voltage 406, that the audio output system is not providing the expected audio output (e.g., because no motion of the coil is detected or reflected in the induced signal).

As another example of a nonoperational or malfunctioning audio output system, a conductive coil may be conductively disconnected or detached, or an audio signal may not ultimately be provided to a conductive coil. In such cases, no induced voltage may be detected by the NFC antenna (e.g., there is no or only nominal voltage variation in the NFC antenna, such as may occur when no audio signal reaches the coil of the audio output system). Under these conditions, the tag 100 can determine, based on the properties of the induced voltage 406 (e.g., no voltage is induced), that the audio output system is not providing the expected audio output (e.g., because no signal is detected in a coil).

While FIGS. 4A-4B illustrate example signals and resultant induced voltages, these are merely examples, and are not necessarily representative of actual audio signals or their induced voltages. Rather, they illustrate how the electrical responses induced by a conductive coil differ based on whether an audio output system is operating correctly, and demonstrate how a system may determine whether an induced signal or voltage is indicative of an operational or nonoperational audio output system.

As described above, an NFC antenna that is positioned at least partially within the magnetic field of the audio output system may be used to detect an electrical response induced by a conductive coil of the audio output system. While the NFC antenna may detect the electrical response of the audio output system (e.g., by detecting characteristics of the magnetic field), the NFC antenna may also provide near-field wireless communication functions. For example, as described herein, the NFC antenna may cause nearby devices to take certain actions or display information. For example, a user may place a smartphone with NFC functionality close to the tag, which may cause the smartphone to display information about the tag, cause a location report to be generated and/or sent, or the like. In some cases, the NFC antenna is operated in different modes of operation to facilitate different functions. For example, the tag (and/or a processing system of the tag) may operate the NFC antenna in a first mode of operation (e.g., a near-field wireless communication mode), in which it transmits a wireless signal to a remote electronic device. The wireless signal may cause the remote electronic device to take one or more actions, as described herein. The tag (and/or a processing system of the tag) may operate the NFC antenna in a second mode of operation, in which it detects an electrical signal in the antenna while an audio signal is supplied to the audio output system.

While the foregoing example describes using an NFC antenna to detect the electrical response, other types of antennas and/or conductive coils or conductive elements may be used instead of or in addition to an NFC antenna to detect the electrical response of the audio output system. For example, a WiFi or Bluetooth antenna may be used. In such cases, the antenna may be operated in different modes of operation to facilitate both wireless communication functions and performance and status monitoring functions for the audio output system, as described with respect to the examples where an NFC antenna is used.

As described herein, a tag (e.g., with a performance and status monitoring system) may detect the electrical response induced by a conductive coil of an audio output system, and may determine, based on the detected electrical response, whether the audio output system fails an audio output performance criteria. As described herein, the audio output system may fail the audio output performance criteria when the detected electrical response (e.g., the electrical response induced in the NFC antenna by the conductive coil) is indicative of the conductive coil failing to move according to an expected motion for a given audible output and/or audio signal (e.g., the coil remaining stationary when the audio signal is provided to the audio output system). The audio system may satisfy the audio output performance criteria when the detected electrical response is indicative of the conductive coil moving (e.g., according to an expected motion) when the audio signal is provided to the audio output system.

In order to determine whether the audio output system fails the audio output performance criteria, the tag may compare the detected electrical response (e.g., the induced voltage 406) against an expected electrical response (e.g., the induced voltage 404), and determine if the detected electrical response is sufficiently similar to the expected electrical response. If the detected electrical response is not sufficiently similar to the expected electrical response, the tag may determine that the audio output system fails the audio output performance criteria. If the detected electrical response is sufficiently similar to the expected electrical response, the tag may determine that the audio output system does not fail the audio output performance criteria. The tag may determine whether the determined electrical response is sufficiently similar to the expected electrical response in various ways. For example, the tag may perform a cross correlation to determine a similarity between the detected electrical response and the expected electrical response. If a value of the cross correlation operation (e.g., a correlation coefficient) satisfies a threshold condition, the tag may determine that the determined electrical response is sufficiently similar to the expected electrical response, and thus determine that the audio output system satisfies the audio output performance criteria. If it fails to satisfy the threshold condition, it may determine that the audio output system fails to satisfy the audio output performance criteria.

Other techniques may be used to determine a similarity between the determined electrical response and the expected electrical response, or to otherwise determine whether the determined electrical response is sufficiently similar to the expected electrical response. For example, the tag may use autocorrelation techniques and/or other statistical comparison techniques. In some cases, the operations for determining a similarity between the determined electrical response and the expected electrical response, or to otherwise determine whether the determined electrical response is sufficiently similar to the expected electrical response, include transforming a detected time-domain signal to a frequency-domain (e.g., using a Fourier transform such as a fast Fourier transform), and performing one or more analysis operations on the frequency-domain signal.

In some cases, the audio output system may fail an audio output performance criteria when an audible output is not produced while an audio signal is supplied to the audio output system. In such cases, the tag may determine whether an audio output is produced (while an audio signal is supplied to the audio output system). If the audible output is detected, the system satisfies the audio output performance criteria. If the audible output is not detected, the system fails the audio output performance criteria. The tag may detect whether the audible output is produced, while an audio signal is supplied to the audio output system, using a microphone, an accelerometer, a transducer, or another suitable system or technique.

Figure 5:
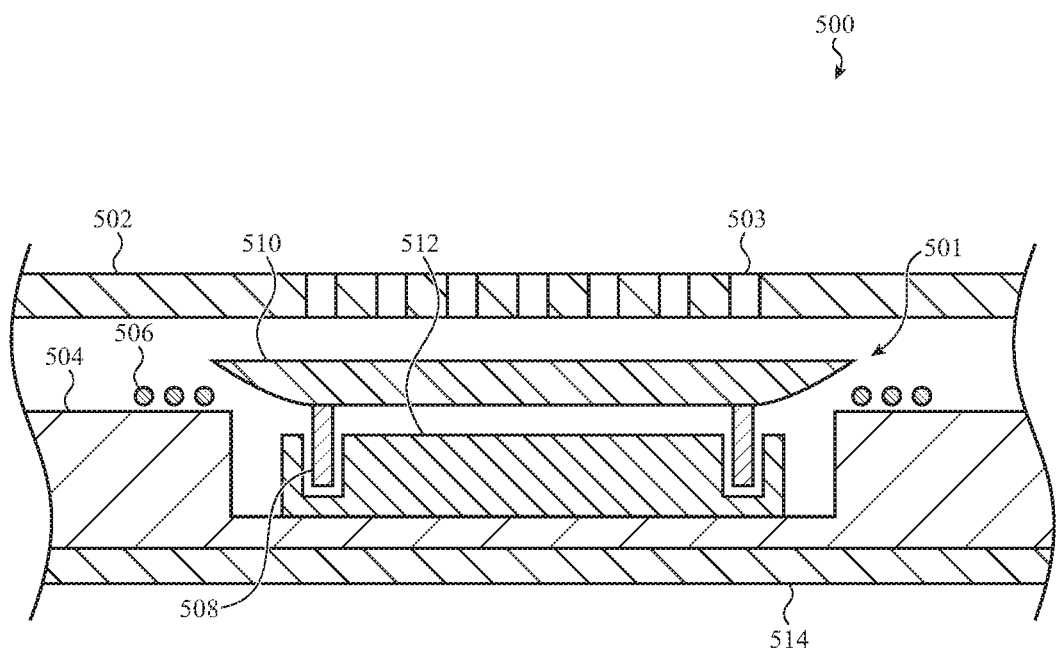
FIG. 5 depicts another example wirelessly locatable tag.

FIG. 5 depicts a cross-sectional view of another example wirelessly locatable tag 500. As shown in FIG. 5, the tag 500 includes a top housing member 502 (also referred to herein as an upper housing member) and a bottom housing member 514 (also referred to herein as a lower housing member), which together may form at least part of an enclosure of the tag. The top and bottom housing members 502, 514 may enclose or house components of the tag 500, as described herein with respect to the tag 500. The top housing member 502 may define a top exterior surface of the tag 500. The top housing member 502 may also define a peripheral side wall defining a peripheral side surface of the tag 500.

Whereas the tag 100 uses a portion of a housing member as a diaphragm of an audio output system, the tag 500 uses a speaker 501, with a dedicated diaphragm or speaker cone, positioned within the housing. For example, an audio output system of the tag 500 may include a diaphragm 510 (e.g., a speaker cone), a coil (or a voice coil) 508, and a magnet 512. The diaphragm 510 may produce audible and/or haptic outputs. For example, the audio system may provide an audio signal to the coil 508, which, due to the presence of a magnetic field of the magnet 512, moves the diaphragm 510 to produce the pressure waves that correspond to the audible output. The audio output system may be attached to a member 504, which may be further attached to the bottom housing member 514. In some cases, the member 504 may be a circuit board, antenna assembly, or another component. In some cases, the magnet 512 and/or other components of the speaker and/or audio output system more generally are coupled to a housing member (e.g., the bottom housing member 514).

To facilitate audio output from the speaker, the tag 500 may include one or more openings 503 through a housing member. The openings 503 may allow sound (e.g., pressure waves) from the internal speaker 501 to pass through the housing member without excessive attenuation. In some cases, instead of or in addition to the openings 503, a mesh, screen, or other sound-permeable structure is provided over or proximate the speaker 501 to allow sound to pass through the housing.

The tag 500 may also include an antenna 506 (or other conductive structure or component). The antenna 506 may be an embodiment of or otherwise correspond to the antenna 307. For example, the antenna 506 may be configured to determine whether the audio output system fails an audio output performance criteria, such as by detecting an electrical response induced in the antenna 506 while the audio signal is supplied to the coil 508. The operation of the antenna 506 and the determination of whether the audio output system fails an audio output performance criteria may follow the same or similar operations and techniques as described above with respect to FIGS. 1A-4B.

Figure 6A:
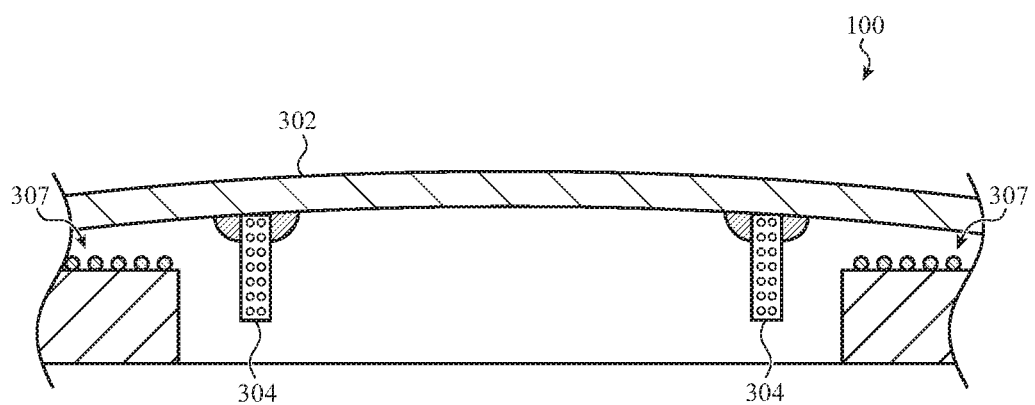
FIGS. 6A-6C depict examples of a broken or damaged wirelessly locatable tag.
Figure 6B:
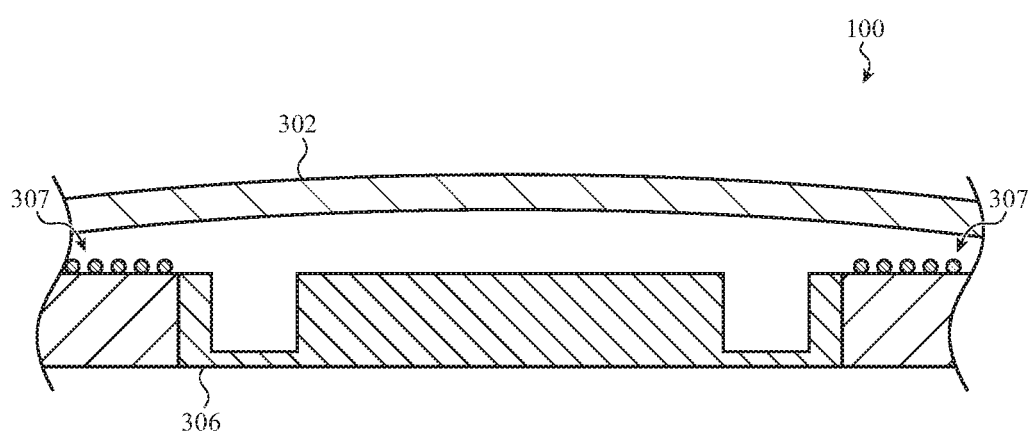
Figure 6C:
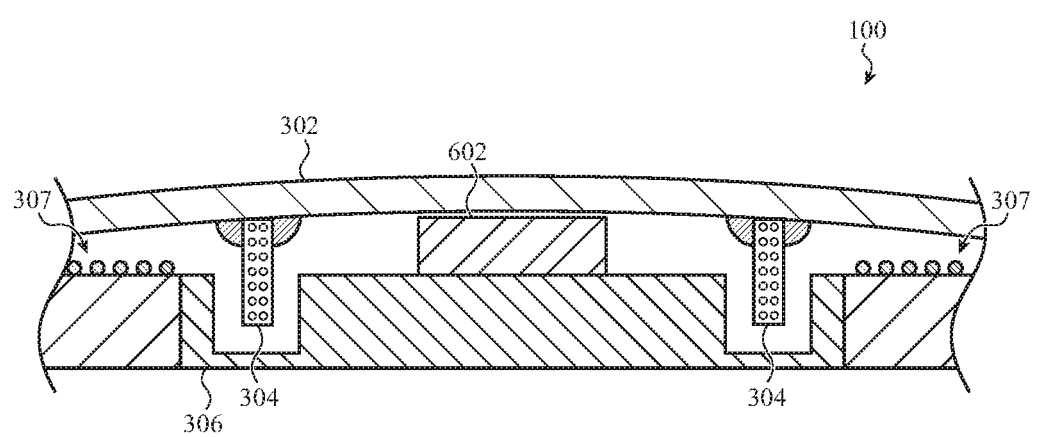

FIGS. 6A-6C depict several examples of a broken or damaged tag 100 that may fail an audio output performance criteria. For example, as shown in FIG. 6A, a magnet 306 of the tag 100 may be missing, displaced, broken, demagnetized, or otherwise fail to provide a magnetic field sufficient for the audio output system to produce sound. The lack of a functioning magnet 306 (and/or a lack of a magnetic field) may result in no movement of a coil 304 (or insufficient or unexpected movement of the coil) when an electric current is induced to flow through the coil 304 to generate an audible and/or haptic output.

FIG. 6B illustrates the tag 100 with the coil 304 missing, broken, conductively decoupled, or otherwise malfunctioning. In this case, when an audio signal is provided to the coil, the coil 304 may not move, and thus the intended audible and/or haptic output may not be generated (and thus the tag will fail the audio output performance criteria).

FIG. 6C illustrates an obstruction 602 that may prevent or inhibit motion of the diaphragm (e.g., the housing member 302 in this example), and thus prevent the coil 304 from moving as intended or expected when an audio signal is supplied to the coil 304. In this case, when an audio signal is provided to the coil, the coil 304 and the diaphragm may not move (or may move less than or differently than expected), and thus the intended audible and/or haptic output may not be generated (and thus the tag will fail the audio output performance criteria). The obstruction 602 may be debris (e.g., dust, sand, dirt, a piece of a broken internal component, etc.), moisture, lotion, or any other contaminant or object that prevents motion of the diaphragm. In some cases, the obstruction 602 shown in FIG. 6C represents a mechanical binding or interference inside the tag 100 (e.g., due to a broken or misaligned component) that prevents the diaphragm from moving as expected or intended.

Figure 7:
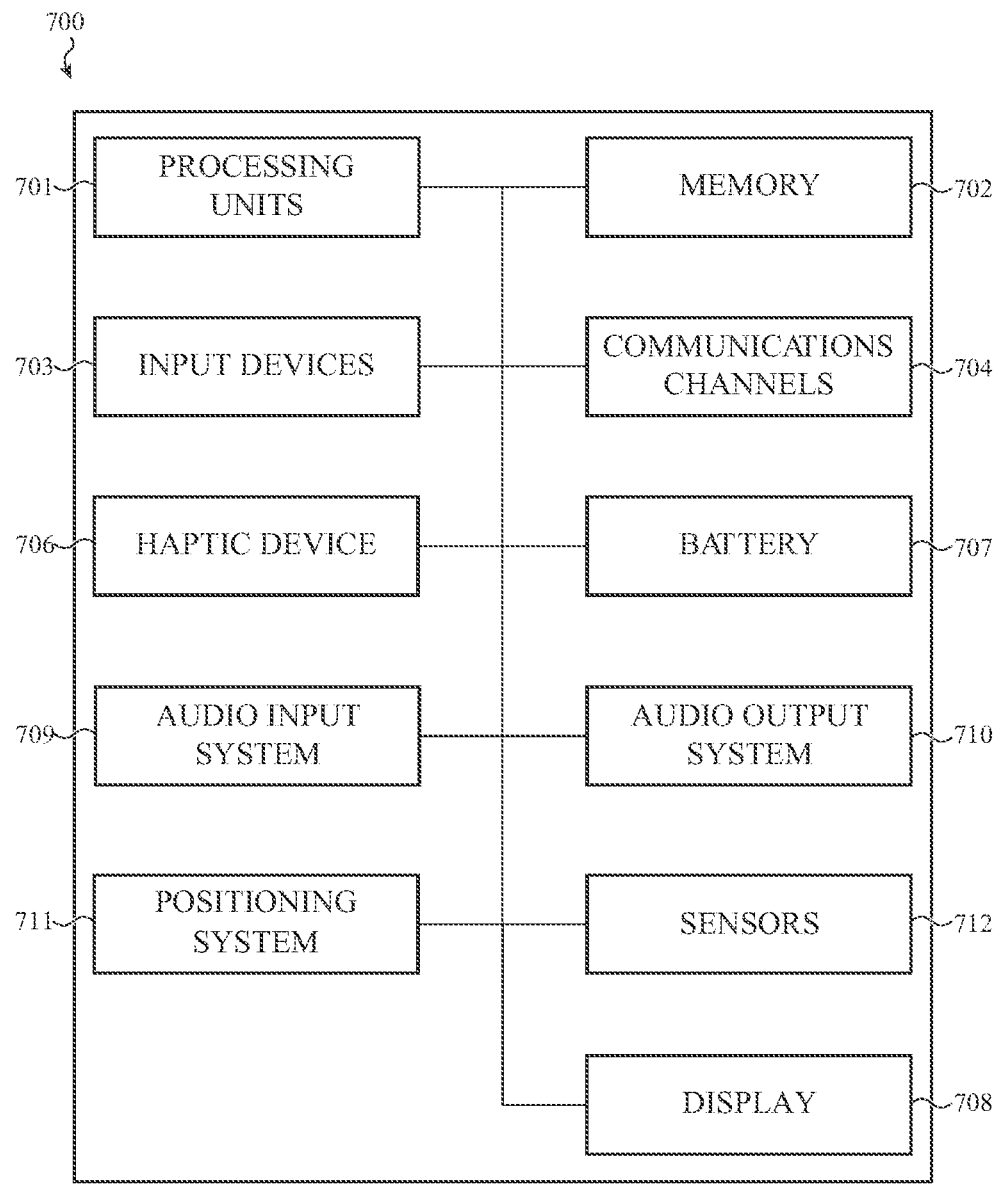
FIG. 7 depicts a schematic diagram of an example wirelessly locatable tag.

FIG. 7 depicts an example schematic diagram of a wirelessly locatable tag 700. The wirelessly locatable tag 700 may represent any of the wirelessly locatable tags, wireless tags, or wireless modules described herein (e.g., the tag 100, 500), and may interact with an electronic device (such as the electronic device 102 and/or 106) to facilitate localization of the wirelessly locatable tag 700. The components and/or systems of the wirelessly locatable tag 700 may correspond to and/or instantiate the systems, modules, and functions described herein. For example, processing units 701, memory 702, communications channels 704, and audio output system 710 (or components thereof) may provide the functions of the performance and status monitoring system, and may be configured to determine whether an audio output system satisfies or fails an audio output performance criteria.

The wirelessly locatable tag 700 as described represents a small, puck-shaped device. As noted above, however, other devices may include the components, systems, and/or modules of the wirelessly locatable tag 700, and may provide the same or similar functionality. Accordingly, the components, systems, and/or modules (and associated programs, operations, and/or instructions) described as being included in the wirelessly locatable tag 700 may also be included in other devices, such as mobile phones (e.g., smartphones), laptop computers, tablet computers, desktop computers, personal digital assistants, watches (e.g., smartwatches) or other wearable devices, wireless routers or other network infrastructure devices, televisions, or any other suitable devices.

The tag 700 includes one or more processing units 701 that are configured to access a memory 702 having instructions stored thereon. The instructions or computer programs may be configured to perform one or more of the operations or functions described with respect to the tags described herein. For example, the instructions may be configured to control or coordinate the operation of one or more communications channels 704, one or more audio input systems 709, one or more input devices 703, one or more audio output systems 710, one or more positioning systems 711, one or more sensors 712, one or more haptic feedback devices 706, and/or one or more optional displays 708.

The processing units 701 of FIG. 7 may be implemented as any electronic device capable of processing, receiving, or transmitting data or instructions. For example, the processing units 701 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 702 can store electronic data that can be used by the tag 700. For example, a memory can store electrical data or content such as, for example, device settings and user preferences, timing and control signals or data for the various modules, data structures or databases, programs, instructions, audio and video files, images, documents and applications, and so on. The memory 702 can be configured as any type of memory. By way of example only, the memory can be implemented as random access memory, read-only memory, Flash memory, removable memory, or other types of storage elements, or combinations of such devices.

The input devices 703 may detect various types of inputs and generate signals or data that are able to be accessed using processor instructions. The input devices 703 may use any suitable components and may rely on any suitable phenomena to detect physical inputs. For example, an input device 703 may be or may use an audio system (e.g., an audio output system) that detects inputs by detecting an electrical signal (e.g., voltage, current) in a coil as a result of the coil being moved in a magnetic field. Other types of input devices 703 may include dome switches, capacitive sensors, resistive sensors, acoustic wave sensors, strain-based sensors, piezoelectric-based sensors, piezoresistive-based sensors, or the like. Input devices 703 may be integrated with the housing of a tag such that a deflection or deformation of the housing, as a result of a user applying an input force to the exterior housing surface, actuates the input device or otherwise produces a detectable event that causes the tag to perform an action (e.g., changing a mode of operation, changing a beacon frequency, etc.).

The input devices 703 may include touch sensors, which may in turn include any suitable components for detecting touch-based inputs and generating signals or data that are able to be accessed using processor instructions, including electrodes (e.g., electrode layers and/or an array of capacitive electrodes), physical components (e.g., substrates, spacing layers, structural supports, compressible elements, etc.) processors, circuitry, firmware, and the like. The touch sensors may be integrated with or otherwise configured to detect touch inputs applied to any portion of the tag 700. For example, the touch sensors may be configured to detect touch inputs applied to any portion of the tag 700 that includes an optional display. Example touch inputs include momentary touches, taps, swipes, and other gesture and non-gesture input. The touch sensors may operate in conjunction with force sensors to generate signals or data in response to touch inputs that may correspond to a location of a touch or type of gesture provided to the input device 703. A touch sensor or force sensor that is positioned over a display surface or otherwise integrated with a display may be referred to herein as a touch-sensitive display, force-sensitive display, or touchscreen.

The input device 703 may also include force sensors, which may in turn detect various types of force-based inputs and generate signals or data that are able to be accessed using processor instructions. The force sensors may use any suitable components and may rely on any suitable phenomena to detect force-based inputs. For example, the force sensors may be strain-based sensors, piezoelectric-based sensors, piezoresistive-based sensors, capacitive sensors, resistive sensors, or the like. The force sensors may include any suitable components for detecting force-based inputs and generating signals or data that correspond to a degree or magnitude of the force-based input and that are able to be accessed using processor instructions, including electrodes (e.g., electrode layers), physical components (e.g., substrates, spacing layers, structural supports, compressible elements, etc.), processors, circuitry, firmware, and the like. The force sensors may be used in conjunction with various input mechanisms to detect various types of inputs. For example, the force sensors may be used to detect a finger press, object press, or other force inputs that result in a force sensor output that satisfies a force threshold (which may represent a more forceful input than is typical for a standard "touch" input). Like the touch sensors, the force sensors may be integrated with or otherwise configured to detect force inputs applied to any suitable portion of the tag 700. For example, the force sensors may be configured to detect force inputs applied to any portion of the tag 700 that includes an optional display (and may be integrated with a display). The force sensors may operate in conjunction with the touch sensors to generate signals or data in response to touch- and/or force-based inputs.

The tag 700 may also provide audio output functionality via one or more audio output systems 710. The audio output systems 710 may include an audio system that uses a housing member as a diaphragm to produce sound, as described above. The audio output systems 710 may also provide audible outputs in response to a detection that a condition of a wirelessly locatable tag has been met, or a signal or instruction from another device (e.g., the device 102 and/or 106), or the like. The audible output may be used to indicate a status of the tag (e.g., to indicate when the tag changes modes), to help a user locate a tag (e.g., by listening for a beep or tone), or the like. An audio output system 710 may correspond to and/or be an embodiment of the audio output system 206 described with respect to FIG. 2.

The tag 700 may also include one or more haptic devices 706. The haptic device 706 may include one or more of a variety of haptic technologies such as, but not necessarily limited to, rotational haptic devices, linear actuators, piezoelectric devices, vibration elements, and so on. In general, the haptic device 706 may be configured to provide punctuated and distinct feedback to a user of the device. More particularly, the haptic device 706 may be adapted to produce a knock or tap sensation and/or a vibration sensation. Such haptic outputs may be provided in response to any suitable condition, such as a receipt of a wireless signal instructing the tag to produce an output (e.g., to help a user locate the tag). Haptic outputs which form a haptic device 706 may be imparted to a user through the exterior surface of the tag 700 (e.g., via a housing member that defines an upper or top surface of the tag and also acts as a speaker diaphragm). Haptic outputs may also be provided in response to a detection that a condition of a wirelessly locatable tag has been satisfied. For example, if a rule relating to the location of a tag is satisfied (e.g., if a tag is detected outside of a specified area or greater than a specified distance from a user or another device), the tag 700 may produce a haptic output using the haptic devices 706. As noted above, the haptic device 706 may be part of an audio output system that uses a housing member as a speaker diaphragm. In other cases, a dedicated haptic device, such as a linear resonant actuator, piezoelectric actuator, or the like, is provided.

The one or more communications channels 704 may include one or more wireless interface(s) that are adapted to provide communication between the processing unit(s) 701 and an external device (e.g., the electronic device 102 and/or 106). The one or more communication channels 704 may include antennas, communications circuitry, firmware, software, or any other components or systems that facilitate wireless communications with other devices (e.g., with devices that facilitate localization of the tag 700, such as the device 102 and/or 106). In general, the one or more communication channels 704 may be configured to transmit and receive data and/or signals that may be interpreted by instructions executed on the processing units 701. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, infrared interfaces, USB interfaces, Wi-Fi interfaces, TCP/IP interfaces, network communications interfaces, or any conventional communication interfaces. The one or more communications channels 704 may also include ultra-wideband interfaces, which may include any appropriate communications circuitry, instructions, and number and position of suitable UWB antennas to facilitate localization of the tag (or other tags or devices with similar functionality), as described herein. For example, the communications channels 704 may perform at least some of the localization processes described herein (or otherwise be used as part of the localization processes or operations). For example, UWB antennas may be operable to send wireless beacon signals to other devices to facilitate localization of the tag 700 or of other devices.

As shown in FIG. 7, the tag 700 may include a battery 707 that is used to store and provide power to the other components of the tag 700. The battery 707 may represent the battery 314, or any other battery described above. The battery 707 may be a button cell battery, or any other suitable type of battery. The battery 707 may be non-rechargeable, or it may be a rechargeable battery or other power supply that is configured to provide power to the tag 700.

The tag 700 may also include a positioning system 711. The positioning system 711 may be configured to determine the location of the tag 700. The positioning system 711 may perform, manage, control, or otherwise facilitate localization operations such as those described herein. The positioning system 711 may optionally include other devices or systems, such as magnetometers, gyroscopes, accelerometers, optical sensors, cameras, global positioning system (GPS) receivers, inertial positioning systems, or the like. Such devices or systems may be used to determine spatial parameters of the tag 700, such as the location of the tag 700 (e.g., geographical coordinates of the device), measurements or estimates of physical movement of the tag 700, an orientation of the tag 700, or the like. The positioning system 711 may also be used to determine spatial parameters of another device, such as another wirelessly locatable tag, a smartphone, or any other suitably configured device. The positioning system may communicate with or otherwise interact with other components of the tag 700, including but not limited to the processing units 701, memory 702, and communications channels 704, to perform such functions or operations.

The tag 700 may also include one or more additional sensors 712 to receive inputs (e.g., from a user or another computer, device, system, network, etc.) or to detect any suitable property or parameter of the device, the environment surrounding the device, people or things interacting with the device (or nearby the device), or the like. For example, a device may include temperature sensors, barometric sensors, biometric sensors (e.g., fingerprint sensors, photoplethysmographs, blood-oxygen sensors, blood sugar sensors, or the like), eye-tracking sensors, retinal scanners, humidity sensors, electric field sensors, magnetic field sensors, buttons, switches, lid-closure sensors, or the like.

The tag 700 may optionally include one or more displays 708 configured to display graphical outputs. (Though, as noted above, in some cases tags 700 may be devoid of displays or other visual output devices.) The optional displays 708 may use any suitable display technology, including liquid crystal displays (LCD), organic light emitting diode (OLED) displays, active-matrix organic light-emitting diode displays (AMOLED), segmented LED displays, or the like. The optional displays 708 may display information relating to the operations, modes, functions, settings, or statuses of a wirelessly locatable tag. For example, a display may display "Lost" if the tag is in a "lost" mode or state, or "Not Lost" if it is in a "not lost" mode or state. In some cases, an optional display 708 may include indicator lights (e.g., light sources that provide a single point or pixel of light). The indicator lights may be LEDs or any other suitable light sources, and may be positioned on a tag in a location that is visible to a user, such as on (or visible along) a top exterior surface, a bottom exterior surface, a peripheral exterior surface, or any other surface. In some cases, the LED or other light source may be positioned within the housing of the tag and proximate an optically transmissive portion of the housing (e.g., a glass, crystal, or plastic housing member or window), such that the light from the LED or other light source is protected in the housing and also visible from outside the tag. The indicator lights may indicate a status of the device, such as a power state, battery charge level, operating mode, lost/not lost status, or the like. In some cases, the indicator lights may be activated in response to the tag being reported lost. For example, the indicator lights may flash (or remain steadily illuminated) to alert nearby people to the presence of the tag and its status as being lost. The indicator lights may be used for other purposes as well.

The tag 700 may also optionally provide audio input functionality via one or more audio input systems 709. The audio input systems 709 may include microphones, transducers, or other devices that capture sound for recording sound content (e.g., vocal recordings to be played back by the tag), receiving voice commands for controlling operation of the tag, or the like.

To the extent that multiple functionalities, operations, and structures described with reference to FIG. 7 are disclosed as being part of, incorporated into, or performed by the tag 700, it should be understood that various embodiments may omit any or all such described functionalities, operations, and structures. Thus, different embodiments of the tag 700 may have some, none, or all of the various capabilities, apparatuses, physical features, modes, and operating parameters discussed herein. Further, the systems included in the tag 700 are not exclusive, and the tag 700 may include alternative or additional systems, components, modules, programs, instructions, or the like, that may be necessary or useful to perform the functions described herein.

As described above, one aspect of the present technology is the gathering and use of data available from specific and legitimate sources to provide the ability to track and find objects. The present disclosure contemplates that, in some instances, this gathered data may include personal information data that uniquely identifies or can be used to identify a specific person. Such personal information data can include demographic data, location-based data (e.g., locations, movements, positions, paths, etc., of a person and/or the person's belongings, devices, home environments, etc.), online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, locations of a user's tags may be recorded to allow users to find their lost possessions. Further, other uses for personal information data that benefit the user are also contemplated by the present disclosure. For instance, health and fitness data may be used, in accordance with the user's preferences, to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to selectively control who can and cannot view or access the location of their tags or other location-enabled devices, and control when outside devices (e.g., devices not owned or controlled by the user) can communicate with a user's tags to provide location reports. In yet another example, users can select to limit the length of time that location information is accessible to others. In yet another example, users can configure their devices (e.g., mobile phones) not to receive, respond to, or otherwise interact with location-enabled devices such as tags. For instance, a user may configure a mobile phone to ignore instructions from tags to send location reports, display messages on behalf of the tags or the like. In addition to providing "opt in" and "opt out" options, the present disclosure contemplates providing notifications relating to the access or use of personal information. For instance, a user may be notified if another user accesses or attempts to access their location or the location of their devices or tags.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to.

Objects or components that are shown or described as being at least partially embedded in or encapsulated by other objects or materials may be formed via insert molding, multi-material injection molding, or any other suitable technique. For example, in insert molding, an object may be placed into a mold, and then a moldable material may be introduced into the mold to at least partially encapsulate or at least partially embed the object in the moldable material. In multi-material injection molding, a first moldable material may be introduced into a mold (and optionally at least partially cured or hardened), followed by a second moldable material. Other techniques may also be used, such as by sewing an object into another material, positioning an object between laminate layers, or the like.

While many examples of functions and use cases are described with specific reference to a wirelessly locatable tag, it will be understood that the same function may be performed by any device that is configured to provide the functionality of the tags described herein. For example, a laptop computer or smartphone may have communications circuitry and other components that are similar to or provide the functions of a wirelessly locatable tag. Thus, any function performed or facilitated by a tag may also be performed or facilitated by a laptop. As one specific example, when a laptop computer is lost or misplaced, other devices in a device-location relay network may receive signals from the laptop (e.g., via Bluetooth, UWB) and send location reports to a server or host system.

What is claimed is:

1. An electronic device comprising:
an enclosure comprising a housing member;
an antenna within the enclosure and configured to transmit a wireless signal to a remote electronic device to allow a location of the electronic device to be determined;
an audio output system configured to produce an audible output and comprising a conductive coil coupled to an interior surface of the housing member, the conductive coil configured to interact with a magnetic field to impart a force on a first the housing member, thereby moving a portion of the housing member to produce the audible output; and
a processing system within the enclosure and configured to:
determine, based on an electrical response induced in the antenna, whether the induced electrical response is indicative of the conductive coil moving in response to an audio signal being applied to the conductive coil;
in accordance with a determination that the induced electrical response is indicative of the conductive coil moving in response to the audio signal, determine that the audio output system satisfies an audio output performance criteria; and
in accordance with a determination that the induced electrical response is indicative of the conductive coil receiving the audio signal but not moving in response to the audio signal, determine that the audio output system fails the audio output performance criteria.

2. The electronic device of claim 1, wherein:
the conductive coil is a first conductive coil; and
the antenna includes a second conductive coil.

3. The electronic device of claim 1, wherein:
the antenna is a first antenna; and
the electronic device further includes a second antenna.

4. The electronic device of claim 1, wherein determining whether the induced electrical response is indicative of the conductive coil moving in response to an audio signal being applied to the conductive coil comprises determining whether the induced electrical response includes a voltage component attributable to movement of the conductive coil in the magnetic field.

5. The electronic device of claim 1, wherein the antenna encircles the conductive coil.

6. The electronic device of claim 1, wherein the processing system is further configured to determine whether no induced electrical response is detected by the antenna when the audio signal is applied to the conductive coil.

7. The electronic device of claim 6, wherein, in accordance with a determination that no induced electrical response is detected, determine that the audio output system fails the audio output performance criteria.

8. An electronic device comprising:
a housing member defining an exterior surface of the electronic device;
a voice coil coupled to the housing member and configured to receive an audio signal configured to cause the voice coil to move a portion of the housing member to produce an audible output;
a conductive coil proximate the voice coil; and
a processing system configured to:
cause the audio signal to be supplied to the voice coil;
detect an electrical response induced in the conductive coil while the audio signal is supplied to the voice coil;
determine whether the detected electrical response is indicative of the voice coil moving or remaining stationary in response to the audio signal;
in accordance with a determination that the detected electrical response is indicative of the voice coil moving in response to the audio signal, determine that the electronic device satisfies an audio output performance criteria; and
in accordance with a determination that the detected electrical response is indicative of the voice coil receiving the audio signal but remaining stationary in response to the audio signal, determine that the electronic device fails the audio output performance criteria.

9. The electronic device of claim 8, wherein determining whether the detected electrical response is indicative of the voice coil moving or remaining stationary in response to the audio signal comprises comparing an electrical signal induced in the conductive coil to an expected electrical signal.

10. The electronic device of claim 9, wherein comparing the electrical signal induced in the conductive coil to the expected electrical signal includes performing a cross-correlation operation.

11. The electronic device of claim 8, wherein the conductive coil is an antenna.

12. The electronic device of claim 11, wherein the antenna is a near-field wireless communication antenna.

13. The electronic device of claim 8, wherein:
the electronic device further comprises an accelerometer configured to detect motion of the electronic device; and
the audible output is produced in accordance with a determination that the electronic device has moved and has not communicated with a particular remote electronic device for a predetermined duration.

14. The electronic device of claim 8, wherein the determination that the detected electrical response is indicative of the voice coil remaining stationary in response to the audio signal is based at least in part on a lack of an expected voltage variation in the conductive coil when the audio signal is supplied to the voice coil.

15. An electronic device comprising:
an enclosure;
an audio output system configured to produce an audible output;
an antenna within the enclosure; and
a processing system configured to:
operate the antenna in a first mode of operation to transmit a wireless signal to a remote electronic device;
operate the antenna in a second mode of operation to detect an electrical signal in the antenna while an audio signal is supplied to the audio output system; and
in accordance with a determination that the detected electrical signal in the antenna is indicative of the audio output system moving in response to the supplied audio signal, determine that the audio output system satisfies an audio output performance criteria; and in accordance with a determination that the detected electrical signal is indicative of the audio output system not moving despite receiving the supplied audio signal, determine that the audio output system fails the audio output performance criteria.

16. The electronic device of claim 15, wherein the antenna is a near-field wireless communication antenna.

17. The electronic device of claim 15, wherein the wireless signal includes an identifier of the electronic device.

18. The electronic device of claim 15, wherein:
the antenna is a first antenna; and
the electronic device further comprises a second antenna configured to send a wireless beacon signal to the remote electronic device to facilitate localization of the electronic device.

19. The electronic device of claim 18, wherein:
the electronic device further comprises an accelerometer configured to detect motion of the electronic device; and
the audible output is produced in accordance with a determination that the electronic device has moved and has not communicated with a particular remote electronic device for a predetermined duration.

20. The electronic device of claim 15, wherein the audible output is produced to alert a user to a location of the electronic device.

* * * * *